United States Patent
Li et al.

(10) Patent No.: US 10,284,467 B2
(45) Date of Patent: May 7, 2019

(54) METHOD AND APPARATUS FOR CONTROLLING PACKET TRANSMISSION AND NETWORK FUNCTIONS VIRTUALIZATION SYSTEM

(71) Applicant: Huawei Technologies Co., Ltd., Shenzhen (CN)

(72) Inventors: Long Li, Shenzhen (CN); Xuewen Gong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 15/487,028

(22) Filed: Apr. 13, 2017

(65) Prior Publication Data

US 2017/0222921 A1 Aug. 3, 2017

Related U.S. Application Data

(63) Continuation of application No. PCT/CN2015/082647, filed on Jun. 29, 2015.

(30) Foreign Application Priority Data

Oct. 13, 2014 (CN) .......................... 2014 1 0538023

(51) Int. Cl.
*H04L 12/721* (2013.01)
*H04L 1/22* (2006.01)
(Continued)

(52) U.S. Cl.
CPC .............. *H04L 45/70* (2013.01); *G06F 8/656* (2018.02); *G06F 11/1433* (2013.01);
(Continued)

(58) Field of Classification Search
None
See application file for complete search history.

(56) References Cited

U.S. PATENT DOCUMENTS 6,658,090 B1 12/2003 Harjunen et al.
9,430,262 B1 * 8/2016 Felstaine ............ G06F 9/45558
(Continued)

FOREIGN PATENT DOCUMENTS

CN 1889041 A 1/2007
CN 101106526 A 1/2008
(Continued)

OTHER PUBLICATIONS

Foreign Communication From a Counterpart Application, European Application No. 15850532.1, Extended European Search Report dated Sep. 13, 2017, 8 pages.
(Continued)

*Primary Examiner* — Diane L Lo
(74) *Attorney, Agent, or Firm* — Conley Rose, P.C.

(57) ABSTRACT

A method and an apparatus for controlling packet transmission and a network functions virtualization (NFV) system, where the method includes determining, by a control device, at least two target service processing units and at least one associated service processing unit, where packets of a target service need to be transmitted to the at least two target service processing units through the at least one associated service processing unit, a first target service processing unit in the at least two target service processing units is configured to perform, on packets of the target service, service processing corresponding to a first software version, and a second target service processing unit in the at least two target service processing units is configured to perform, on packets of the target service, service processing corresponding to a second software version; and sending first control information according to a preset first threshold.

46 Claims, 6 Drawing Sheets

(51) Int. Cl.
  *H04L 12/24* (2006.01)
  *H04L 12/26* (2006.01)
  *H04L 12/771* (2013.01)
  *H04L 12/713* (2013.01)
  *G06F 11/14* (2006.01)
  *G06F 11/16* (2006.01)
  *G06F 8/656* (2018.01)

(52) U.S. Cl.
  CPC ............ *G06F 11/1629* (2013.01); *H04L 1/22* (2013.01); *H04L 41/00* (2013.01); *H04L 41/0659* (2013.01); *H04L 43/0817* (2013.01); *H04L 45/56* (2013.01); *H04L 45/586* (2013.01)

(56) References Cited

U.S. PATENT DOCUMENTS

| | | |
|---|---|---|
| 2010/0195647 A1 | 8/2010 | Wang et al. |
| 2014/0201374 A1 | 7/2014 | Ashwood-Smith et al. |
| 2014/0229928 A1 | 8/2014 | Edstrom et al. |

FOREIGN PATENT DOCUMENTS

| | | | |
|---|---|---|---|
| CN | 101996130 | A | 3/2011 |
| CN | 101997708 | A | 3/2011 |
| CN | 102263666 | A | 11/2011 |
| WO | 2008117205 | A2 | 10/2008 |

OTHER PUBLICATIONS

Machine Translation and Abstract of Chinese Publication No. CN102263666, Nov. 30, 2011, 23 pages.
Foreign Communication From a Counterpart Application, Chinese Application No. 201410538023.8, Chinese Office Action dated Feb. 24, 2018, 5 pages.
Machine Translation and Abstract of Chinese Publication No. CN1889041, Jan. 3, 2007, 17 pages.
Machine Translation and Abstract of Chinese Publication No. CN101996130, Mar. 30, 2011, 10 pages.
Machine Translation and Abstract of Chinese Publication No. CN101997708, Mar. 30, 2011, 10 pages.
Huawei Tech Ltd, "VNF upgrade with no service interruption," Feb. 12, 2014, 8 pages.
Foreign Communication From a Counterpart Application, PCT Application No. PCT/CN2015/082647, English Translation of International Search Report dated Aug. 12, 2015, 2 pages.
Foreign Communication From a Counterpart Application, PCT Application No. PCT/CN2015/082647, English Translation of Written Opinion dated Aug. 12, 2015, 7 pages.
"Network Functions Virtualisation (NFV); Architectural Framework", Group Specification, ETSI GS NFV 002 V1.1.1, Oct. 2013, 21 pages.

* cited by examiner

200

When determining that software corresponding to a target service needs to be upgraded from a first software version to a second software version, a control device determines at least two target service processing units and at least one associated service processing unit from the M service processing units, where packets of the target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version ⟶ S210

Send first control information according to a preset first threshold, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period ⟶ S220

When software corresponding to the target service needs to be upgraded from the first software version to the second software version, the target associated service processing unit in the at least one associated service receives first control information that is sent by a control device according to a preset first threshold — S410

Transmit packets of the target service to the first target service processing unit or the second target service processing unit in a first time period according to the first control information, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period — S420

Apparatus for controlling packet transmission 500

Determining unit 510

Sending unit 520

FIG. 5

METHOD AND APPARATUS FOR CONTROLLING PACKET TRANSMISSION AND NETWORK FUNCTIONS VIRTUALIZATION SYSTEM

CROSS-REFERENCE TO RELATED APPLICATIONS

This application is a continuation of International Patent Application No. PCT/CN2015/082647, filed on Jun. 29, 2015, which claims priority to Chinese Patent Application No. 201410538023.8, filed on Oct. 13, 2014. Both of the aforementioned applications are hereby incorporated by reference in their entireties.

TECHNICAL FIELD

The present disclosure relates to the communications field, and in particular, to a method and an apparatus for controlling packet transmission.

BACKGROUND

To meet challenges in future competition and avoid being pipelined, a telecommunications operator attaches more importance to a network functions virtualization (NFV) technology. In the NFV technology, the operator processes a service packet using processing software and a service processing unit (also referred to as a network element), so as to provide a service for a user (or a terminal device on which client software for implementing a service function is installed) that sends the packet.

Moreover, to enhance competitive strength, the operator gradually increases frequency of updating services (or the processing software of the service processing unit). In addition, services in the telecommunications field have a relatively high requirement on reliability. For example, it is required that a service interruption time every year should be less than a specified value (for example, five minutes). Therefore, in the NFV technology, it is required that services should not be interrupted in a software upgrade process of the service processing unit.

To meet the foregoing requirement, in an existing NFV system, a master board and a slave board are generally configured for a service processing unit. Normally, the master board is configured to process a service packet sent by a terminal device. During an upgrade of the master board, the slave board takes over the job of the master board. During an upgrade of processing software of the service processing unit, first, processing software of the slave board is upgraded. After the upgrade of the processing software of the slave board is completed, service processing is handed over from the master board to the slave board, and then processing software of the master board is upgraded. After the upgrade of the processing software of the master board is completed, service processing is handed over from the slave board to the master board. In this way, a software upgrade is implemented without interrupting services.

However, in the foregoing technology, when the master board and the slave board are put into operation after the upgrade of the processing software is completed, that is, started after the upgrade, all service packets are processed by the master board or the slave board whose processing software is upgraded. For example, when there is a defect in a new version, service access of all users may be affected.

SUMMARY

Embodiments of the present disclosure provide a method and an apparatus for controlling packet transmission and an NFV system, which can improve user experience during a software upgrade.

According to a first aspect, a method for controlling packet transmission is provided, where the method is performed in an NFV system including M service processing units, where M≥3, and the method includes, when determining that software corresponding to a target service needs to be upgraded from a first software version to a second software version, determining, by a control device, at least two target service processing units and at least one associated service processing unit from the M service processing units, where packets of the target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version; and sending first control information according to a preset first threshold, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

With reference to the first aspect, in a first implementation manner of the first aspect, the method further includes sending second control information according to a preset second threshold, so as to control packet transmission performed for the target service between the associated service processing unit and the target service processing units in a second time period, so that a ratio of a quantity of third packets to a quantity of fourth packets is greater than the first threshold and that the ratio of the quantity of the third packets to the quantity of the fourth packets is greater than or less than or equal to the second threshold, where the second threshold is greater than the first threshold, the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

With reference to the first aspect and the foregoing implementation manner of the first aspect, in a second implementation manner of the first aspect, the sending second control information according to a preset second threshold includes obtaining first running status information, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period; and when determining, according to the first running status information, that the second target service processing unit runs normally in the first time period, sending the second control information according to the preset second threshold.

With reference to the first aspect and the foregoing implementation manners of the first aspect, in a third implementation manner of the first aspect, the method further includes sending third control information, where the third control information is used to indicate that the associated service processing unit is forbidden to transmit packets of the target service to the first target service processing unit in a third time period, where the third time period is later than the first time period.

With reference to the first aspect and the foregoing implementation manners of the first aspect, in a fourth implementation manner of the first aspect, the sending third control information includes obtaining second running status information, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period; and when determining, according to the running status information, that the second target service processing unit runs normally before the third time period, sending the third control information to the associated service processing unit according to the preset second threshold.

With reference to the first aspect and the foregoing implementation manners of the first aspect, in a fifth implementation manner of the first aspect, the first control information is used to indicate the first threshold.

With reference to the first aspect and the foregoing implementation manners of the first aspect, in a sixth implementation manner of the first aspect, a quantity of the associated service processing units is at least three; and the sending first control information according to a preset first threshold includes grouping the associated service processing units according to the first threshold and the quantity of the associated service processing units, so as to determine a first associated service processing unit group and a second associated service processing unit group, where a ratio of a quantity of associated service processing units included in the first associated service processing unit group to a quantity of associated service processing units included in the second associated service processing unit group corresponds to the first threshold; and sending first control information of a first mode to the associated service processing units included in the first associated service processing unit group, where the first control information of the first mode is used to indicate that packets of the target service need to be transmitted to the second target service processing unit; or sending first control information of a second mode to the associated service processing units included in the second associated service processing unit group, where the first control information of the second mode is used to indicate that packets of the target service need to be transmitted to the first target service processing unit.

With reference to the first aspect and the foregoing implementation manners of the first aspect, in a seventh implementation manner of the first aspect, the grouping the associated service processing units according to the first threshold and the quantity of the associated service processing units includes grouping the associated service processing units according to the first threshold, the quantity of the associated service processing units, and geographical locations of physical resources of the associated service processing units.

With reference to the first aspect and the foregoing implementation manners of the first aspect, in an eighth implementation manner of the first aspect, the sending first control information according to a preset first threshold includes determining a mapping relationship between at least two service levels and the at least two target service processing units according to the first threshold, where one service level corresponds to only one target service processing unit; and sending first control information of a third mode to the associated service processing unit, where the first control information of the third mode is used to indicate the mapping relationship, so that when the associated service processing unit receives a first packet of the target service, the associated service processing unit looks up the mapping relationship according to identifier information carried in the first packet and used to indicate a service level of the first packet, so as to send the first packet to a service processing unit corresponding to the service level of the first packet.

According to a second aspect, a method for controlling packet transmission is provided, where the method is performed in an NFV system including M service processing units, and the M service processing units include at least two target service processing units and at least one associated service processing unit, where packets of the target service need to be transmitted to the at least two target service processing units through the at least one associated service processing unit, a first target service processing unit in the at least two target service processing units is configured to perform, on packets of the target service, service processing corresponding to a first software version, a second target service processing unit in the at least two target service processing units is configured to perform, on packets of the target service, service processing corresponding to a second software version, M≥3, and the method includes, when software corresponding to the target service needs to be upgraded from the first software version to the second software version, receiving, by the target associated service processing unit in the at least one associated service, first control information that is sent by a control device according to a preset first threshold; and transmitting packets of the target service to the first target service processing unit or the second target service processing unit in a first time period according to the first control information, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

With reference to the second aspect, in a first implementation manner of the second aspect, the method further includes receiving second control information that is sent by the control device according to a preset second threshold, where the second threshold is greater than the first threshold; and transmitting packets of the target service to the first target service processing unit or the second target service processing unit in a second time period according to the second control information, so that a ratio of a quantity of third packets to a quantity of fourth packets is greater than the first threshold and that the ratio of the quantity of the third packets to the quantity of the fourth packets is greater than or less than or equal to the second threshold, where the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

With reference to the second aspect and the foregoing implementation manner of the second aspect, in a second implementation manner of the second aspect, the second control information is sent after the control device obtains first running status information and determines, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

With reference to the second aspect and the foregoing implementation manners of the second aspect, in a third implementation manner of the second aspect, the method further includes receiving third control information sent by the control device, where the third control information is used to indicate that the associated service processing unit is forbidden to transmit packets of the target service to the first target service processing unit in a third time period, where the third time period is later than the first time period; and forbidding, in the third time period according to the third control information, transmitting the packets of the target service to the first target service processing unit.

With reference to the second aspect and the foregoing implementation manners of the second aspect, in a fourth implementation manner of the second aspect, the third control information is sent after the control device obtains second running status information and determines, according to the second running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

With reference to the second aspect and the foregoing implementation manners of the second aspect, in a fifth implementation manner of the second aspect, the first control information is used to indicate the first threshold.

With reference to the second aspect and the foregoing implementation manners of the second aspect, in a sixth implementation manner of the second aspect, a quantity of the associated service processing units is at least three; and the receiving first control information that is sent by a control device according to a preset first threshold includes receiving control information of a first mode that is sent by the control device according to the preset first threshold, where the first control information of the first mode is used to indicate that packets of the target service need to be transmitted to the second target service processing unit, and the target associated service processing unit belongs to a first associated service processing unit group; or receiving control information of a second mode that is sent by the control device according to the preset first threshold, where the first control information of the second mode is used to indicate that packets of the target service need to be transmitted to the first target service processing unit, and the target associated service processing unit belongs to a second associated service processing unit group, where the first associated service processing unit group and the second associated service processing unit group are determined by the control device by grouping the associated service processing units according to the first threshold and the quantity of the associated service processing units.

With reference to the second aspect and the foregoing implementation manners of the second aspect, in a seventh implementation manner of the second aspect, the first associated service processing unit group and the second associated service processing unit group are determined by the control device by grouping the associated service processing units according to the first threshold, the quantity of the associated service processing units, and geographical locations of physical resources of the associated service processing units.

With reference to the second aspect and the foregoing implementation manners of the second aspect, in an eighth implementation manner of the second aspect, the receiving first control information that is sent by a control device according to a preset first threshold includes receiving first control information of a third mode that is sent by the control device according to the preset first threshold, where the first control information of the third mode is used to indicate a mapping relationship between at least two service levels and the at least two target service processing units, and the mapping relationship is determined by the control device according to the first threshold; and the transmitting packets of the target service to the first target service processing unit or the second target service processing unit in a first time period according to the first control information includes receiving a first packet of the target service in the first time period; and looking up the mapping relationship according to identifier information carried in the first packet and used to indicate a service level of the first packet, so as to send the first packet to a service processing unit corresponding to the service level of the first packet.

According to a third aspect, an apparatus for controlling packet transmission is provided, where the apparatus is configured in an NFV system including M service processing units, where M≥3, and the apparatus includes a determining unit configured to, when determining that software corresponding to a target service needs to be upgraded from a first software version to a second software version, determine at least two target service processing units and at least one associated service processing unit from the M service processing units, where packets of the target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version; and generate first control information according to a preset first threshold; and a sending unit configured to send the first control information, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

With reference to the third aspect, in a first implementation manner of the third aspect, the determining unit is further configured to generate second control information according to a preset second threshold; and the sending unit is further configured to send the second control information, so as to control packet transmission performed for the target service between the associated service processing unit and the target service processing units in a second time period, so that a ratio of a quantity of third packets to a quantity of fourth packets is greater than the first threshold and that the ratio of the quantity of the third packets to the quantity of the fourth packets is greater than or less than or equal to the second threshold, where the second threshold is greater than the first threshold, the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

With reference to the third aspect and the foregoing implementation manner of the third aspect, in a second implementation manner of the third aspect, before the sending unit sends the second control information, the determining unit is further configured to obtain first running status information, and determine, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

With reference to the third aspect and the foregoing implementation manners of the third aspect, in a third implementation manner of the third aspect, the sending unit is further configured to send third control information to the associated service processing unit, where the third control information is used to indicate that the associated service processing unit is forbidden to transmit packets of the target service to the first target service processing unit in a third time period, where the third time period is later than the first time period.

With reference to the third aspect and the foregoing implementation manners of the third aspect, in a fourth implementation manner of the third aspect, before the sending unit is further configured to send the third control information to the associated service processing unit, the determining unit is further configured to obtain second running status information, and determine, according to the running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

With reference to the third aspect and the foregoing implementation manners of the third aspect, in a fifth implementation manner of the third aspect, the first control information is used to indicate the first threshold.

With reference to the third aspect and the foregoing implementation manners of the third aspect, in a sixth implementation manner of the third aspect, a quantity of the associated service processing units is at least three; and the determining unit is configured to group the associated service processing units according to the first threshold and the quantity of the associated service processing units, so as to determine a first associated service processing unit group and a second associated service processing unit group, where a ratio of a quantity of associated service processing units included in the first associated service processing unit group to a quantity of associated service processing units included in the second associated service processing unit group corresponds to the first threshold; and generate first control information of a first mode that needs to be sent to the associated service processing units included in the first associated service processing unit group, where the first control information of the first mode is used to indicate that packets of the target service need to be transmitted to the second target service processing unit; or generate first control information of a second mode that needs to be sent to the associated service processing units included in the second associated service processing unit group, where the first control information of the second mode is used to indicate that packets of the target service need to be transmitted to the first target service processing unit.

With reference to the third aspect and the foregoing implementation manners of the third aspect, in a seventh implementation manner of the third aspect, the determining unit is configured to group the associated service processing units according to the first threshold, the quantity of the associated service processing units, and geographical locations of physical resources of the associated service processing units.

With reference to the third aspect and the foregoing implementation manners of the third aspect, in an eighth implementation manner of the third aspect, the determining unit is configured to determine a mapping relationship between at least two service levels and the at least two target service processing units according to the first threshold, where one service level corresponds to only one target service processing unit, and generate first control information of a third mode, where the first control information of the third mode is used to indicate the mapping relationship; and the sending unit is configured to send the first control information of the third mode to the associated service processing unit, so that when the associated service processing unit receives a first packet of the target service, the associated service processing unit looks up the mapping relationship according to identifier information carried in the first packet and used to indicate a service level of the first packet, so as to send the first packet to a service processing unit corresponding to the service level of the first packet.

According to a fourth aspect, an apparatus for controlling packet transmission is provided, where the apparatus is configured in an NFV system including M service processing units, and the M service processing units include at least two target service processing units and at least one associated service processing unit, where packets of the target service need to be transmitted to the at least two target service processing units through the at least one associated service processing unit, a first target service processing unit in the at least two target service processing units is configured to perform, on packets of the target service, service processing corresponding to a first software version, a second target service processing unit in the at least two target service processing units is configured to perform, on packets of the target service, service processing corresponding to a second software version, M≥3, and the apparatus belongs to the associated service processing unit and includes a receiving unit configured to receive, when software corresponding to the target service needs to be upgraded from the first software version to the second software version, first control information that is sent by a control device according to a preset first threshold; and a control unit configured to control, in a first time period according to the first control information, a sending unit to transmit packets of the target service to the first target service processing unit or the second target service processing unit, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

With reference to the fourth aspect, in a first implementation manner of the fourth aspect, the receiving unit is further configured to receive second control information that is sent by the control device according to a preset second threshold, where the second threshold is greater than the first threshold; and the control unit is further configured to control, in a second time period according to the second control information, the sending unit to transmit packets of the target service to the first target service processing unit or the second target service processing unit, so that a ratio of a quantity of third packets to a quantity of fourth packets is greater than the first threshold and that the ratio of the quantity of the third packets to the quantity of the fourth packets is greater than or less than or equal to the second threshold, where the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

With reference to the fourth aspect and the foregoing implementation manner of the fourth aspect, in a second implementation manner of the fourth aspect, the second control information is sent after the control device obtains first running status information and determines, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

With reference to the fourth aspect and the foregoing implementation manners of the fourth aspect, in a third implementation manner of the fourth aspect, the receiving unit is further configured to receive third control information sent by the control device, where the third control information is used to indicate that the associated service processing unit is forbidden to transmit packets of the target service to the first target service processing unit in a third time period, where the third time period is later than the first time period; and the control unit is further configured to forbid, in the third time period according to the third control information, the sending unit to transmit the packets of the target service to the first target service processing unit.

With reference to the fourth aspect and the foregoing implementation manners of the fourth aspect, in a fourth implementation manner of the fourth aspect, the third control information is sent after the control device obtains second running status information and determines, according to the second running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

With reference to the fourth aspect and the foregoing implementation manners of the fourth aspect, in a fifth implementation manner of the fourth aspect, the first control information is used to indicate the first threshold.

With reference to the fourth aspect and the foregoing implementation manners of the fourth aspect, in a sixth implementation manner of the fourth aspect, a quantity of the associated service processing units is at least three; and the receiving unit is configured to receive control information of a first mode that is sent by the control device according to the preset first threshold, where the first control information of the first mode is used to indicate that packets of the target service need to be transmitted to the second target service processing unit, and the target associated service processing unit belongs to a first associated service processing unit group; or the receiving unit is configured to receive control information of a second mode that is sent by the control device according to the preset first threshold, where the first control information of the second mode is used to indicate that packets of the target service need to be transmitted to the first target service processing unit, and the target associated service processing unit belongs to a second associated service processing unit group, where the first associated service processing unit group and the second associated service processing unit group are determined by the control device by grouping the associated service processing units according to the first threshold and the quantity of the associated service processing units.

With reference to the fourth aspect and the foregoing implementation manners of the fourth aspect, in a seventh implementation manner of the fourth aspect, the first associated service processing unit group and the second associated service processing unit group are determined by the control device by grouping the associated service processing units according to the first threshold, the quantity of the associated service processing units, and geographical locations of physical resources of the associated service processing units.

With reference to the fourth aspect and the foregoing implementation manners of the fourth aspect, in an eighth implementation manner of the fourth aspect, the receiving unit is configured to receive first control information of a third mode that is sent by the control device according to the preset first threshold, where the first control information of the third mode is used to indicate a mapping relationship between at least two service levels and the at least two target service processing units, and the mapping relationship is determined by the control device according to the first threshold; and the control unit is configured to obtain a first packet of the target service in the first time period, and look up the mapping relationship according to identifier information carried in the first packet and used to indicate a service level of the first packet, so as to control the sending unit to send the first packet to a service processing unit corresponding to the service level of the first packet.

According to a fifth aspect, an NFV system is provided and includes M service processing units, where the M service processing units include at least two target service processing units and at least one associated service processing unit, packets of a target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version; and a control device configured to send first control information to the associated service processing unit according to a preset first threshold when determining that software corresponding to the target service needs to be upgraded from the first software version to the second software version, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

With reference to the fifth aspect, in a first implementation manner of the fifth aspect, the control device is further configured to send third control information to the associated service processing unit, where the third control information is used to indicate that the associated service processing unit is forbidden to transmit packets of the target service to the first target service processing unit in a third time period, where the third time period is later than the first time period.

According to the method and the apparatus for controlling packet transmission and the NFV system in the embodiments of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

BRIEF DESCRIPTION OF THE DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 2 is a schematic flowchart of a method for controlling packet transmission according to an embodiment of the present disclosure;

FIG. 4 is a schematic flowchart of a method for controlling packet transmission according to another embodiment of the present disclosure;

FIG. 5 is a schematic block diagram of an apparatus for controlling packet transmission according to an embodiment of the present disclosure;

DETAILED DESCRIPTION

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In the technical solutions of the present disclosure, service packets may be transmitted between the NFV system and user equipment using various communications systems, so that services are provided for the user equipment. The foregoing communications systems, for example, may be a Global System for Mobile Communications (GSM), a Code Division Multiple Access (CDMA) system, a Wideband Code Division Multiple Access (WCDMA), a general packet radio service (GPRS), and a Long Term Evolution (LTE).

User equipment (UE) may also be referred to as a mobile terminal, mobile user equipment, and the like. The user equipment may communicate with one or more core networks using a radio access network (RAN). The user equipment may be a mobile terminal such as a mobile phone (or referred to as a "cellular" phone), or a computer having a mobile terminal; for example, the user equipment may be a portable, pocket-sized, handheld, computer built-in, or in-vehicle mobile apparatus, which exchanges voice and/or data with the radio access network.

The following first describes an NFV system of a method for controlling packet transmission according to an embodiment of the present disclosure.

Figure 1:
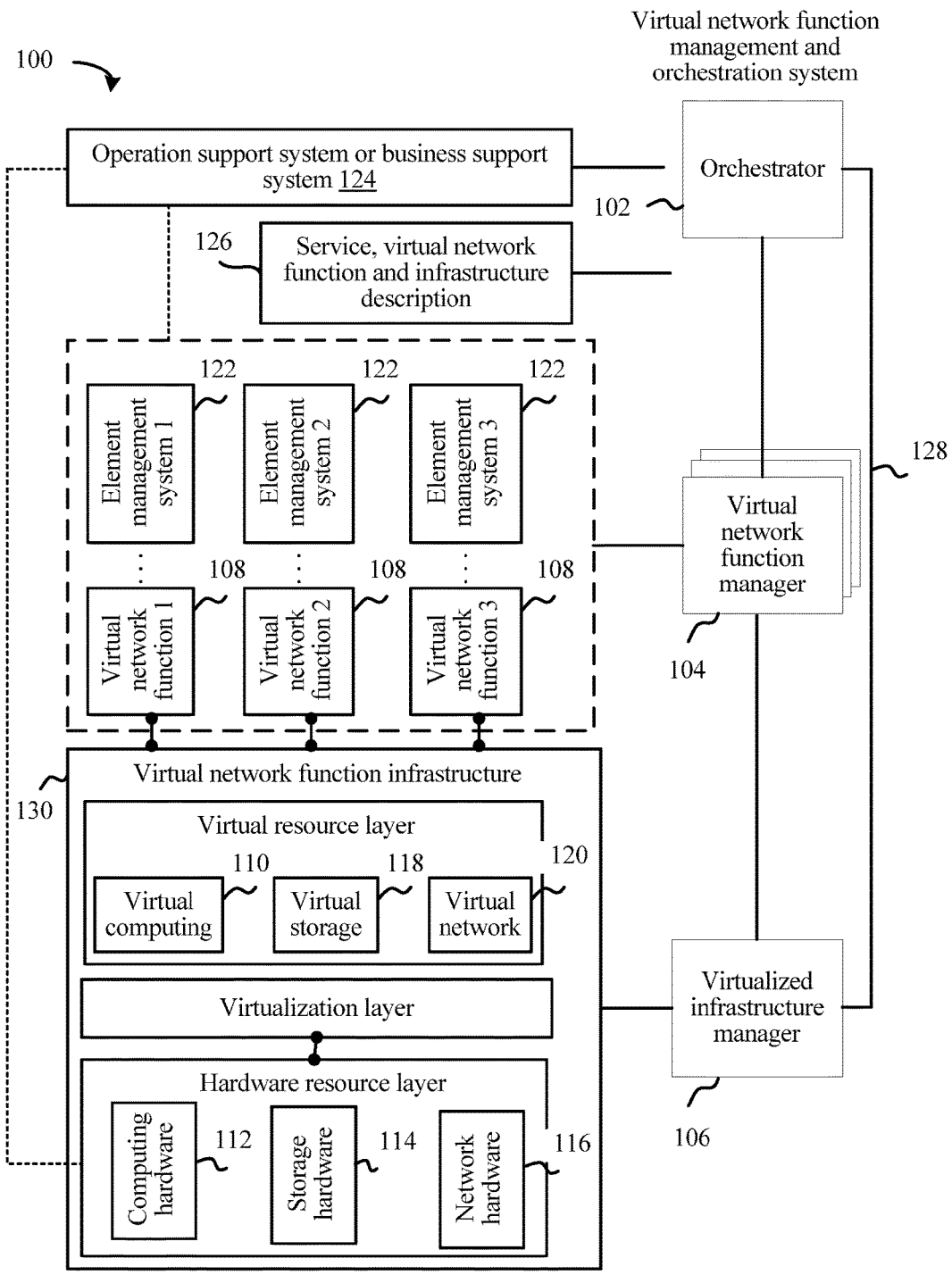
FIG. 1 is a schematic architectural diagram of an NFV system to which a method for controlling packet transmission according to an embodiment of the present disclosure is applicable.

FIG. 1 shows a schematic architectural diagram of an NFV system 100 to which a method for controlling packet transmission according to an embodiment of the present disclosure is applicable. The NFV system may be implemented using multiple networks, for example, a data center network, a service provider network, and a local area network (LAN). As shown in FIG. 1, the NFV system 100 may include a management and orchestration system (MANO) 128, an NFV infrastructure (NFVI) 130, multiple virtual network functions (VNF) 108, multiple element management systems (EMS) 122, a service virtual network function (Service VNF) and infrastructure description system 126, and one or more operation support systems or business support systems (OSS/BSS) 124.

The MANO 128 may include an orchestrator 102, one or more VNF managers 104, and one or more virtualized infrastructure managers 106.

The NFVI 130 may include a hardware resource layer including computing hardware 112, storage hardware 114, and network hardware 116, a virtualization layer, and a virtual resource layer including virtual computing 110 (such as a virtual machine), virtual storage 118, and a virtual network 120. The computing hardware 112 may be a dedicated processor or a general purpose processor configured to provide processing and computing functions. The storage hardware 114 is configured to provide a storage capability, where the storage capability may be provided by the storage hardware 114 itself (for example, a local memory of a server), or may be provided by a network (for example, a server is connected to a network storage device using a network). The network hardware 116 may be a switch, a router, and/or other network devices. The network hardware 116 is configured to implement communication between multiple devices, and the multiple devices are connected in a wireless or wired manner. The virtualization layer in the NFVI 130 is configured to abstract hardware resources at the hardware resource layer, decouple the VNF 108 from a physical layer to which the hardware resources belong, and provide virtual resources to the VNF.

As shown in FIG. 1, the virtual resources may include the virtual computing 110, the virtual storage 118, and the virtual network 120. The virtual computing 110 and the virtual storage 118 may provide virtual resources such as virtual machines or other forms of virtual containers to the VNF 108. For example, one or more VNFs 108 may be deployed on a virtual machine. The virtualization layer forms the virtual network 120 by abstracting the network hardware 116. The virtual network 120, for example, a virtual switch (Vswitches), is configured to implement communication between multiple virtual machines or between multiple virtual containers bearing VNFs, of other types. Virtualization of the network hardware may be implemented using a technology such as a virtual LAN (VLAN), a virtual private local area network service (VPLS), a virtual extensible local area network (VxLAN), or network virtualization using generic routing encapsulation (NVGRE).

The OSS/BSS 124 is mainly oriented to a telecommunications operator, and provides integrated network management and service operation functions, including network management (for example, fault monitoring and network information collection), charging management, customer service management, and the like. The Service VNF and Infrastructure Description system 126 is described in detail in the standard European Telecommunications Standards Institute (ETSI) Group Specification (GS) NFV 002 v1.1.1 standard, and is not described herein again in this embodiment of the present disclosure.

The MANO 128 may be configured to monitor and manage the VNF 108 and the NFVI 130. The orchestrator 102 may communicate with one or more VNF managers 104 to implement resource-related requests, send configuration information to the VNF manager 104, and collect status information of the VNF 108. In addition, the orchestrator 102 may further communicate with the virtualized infrastructure manager 106 to implement resource allocation, and/or implement reservation and exchange of configuration information and status information of virtualized hardware resources. The VNF manager 104 may be configured to manage one or more VNFs 108, and execute various management functions, for example, initializing, updating, querying, and/or terminating the VNF 108. The virtualized infrastructure manager 106 may be configured to control and manage interactions between the VNF 108, and the computing hardware 112, the storage hardware 114, the network hardware 116, the virtual computing 110, the virtual storage 118, and the virtual network 120. For example, the virtualized infrastructure manager 106 may be configured to perform an operation of allocating a resource to the VNF 108. The VNF manager 104 and the virtualized infrastructure manager 106 may mutually communicate to exchange virtualized hardware resource configurations and status information.

The NFVI 130 includes hardware and software, which jointly establish a virtualized environment to deploy, manage, and execute the VNF 108. In other words, the hardware resource layer and the virtual resource layer are configured to provide virtual resources such as virtual machines and/or virtual containers in other forms to the VNF 108.

As shown in FIG. 1, the VNF manager 104 may communicate with the VNF 108 and the EMS 122 to perform VNF lifecycle management and implement exchange of configuration information or status information. The VNF 108 is virtualization of at least one network function, where the network function is previously provided by a physical network device. In an implementation manner, the VNF 108 may be a virtualized mobility management entity (MME) node configured to provide all network functions provided by a typical non-virtualized MME device. In another implementation manner, the VNF 108 may be configured to implement functions of some components in all components provided by a non-virtualized MME device. One or more VNFs 108 may be deployed on a virtual machine (or a virtual container in another form). The EMS 122 may be configured to manage one or more VNFs.

Optionally, the control device is a management and orchestration MANO device.

In this embodiment of the present disclosure, the VNF 108 may serve as a service processing unit, and the MANO 128 may serve as a control device and control packet transmission between VNFs 108.

It should be understood that, the foregoing illustrated network elements in the NFV system 100 corresponding to the service processing unit and the control device are intended for exemplary description only, but the present disclosure is not limited thereto. All other network elements that can implement functions of the service processing unit and the control device shall fall within the protection scope of the present disclosure. For ease of understanding, a method for controlling packet transmission according to an embodiment of the present disclosure is hereinafter described using an example in which the MANO 128 serves as a control device and the VNF 108 serves as a service processing unit.

FIG. 2 shows a schematic flowchart of a method 200 for controlling packet transmission according to an embodiment of the present disclosure. The method is described from a perspective of a control device.

As shown in FIG. 2, the method 200 includes the following steps.

S210. When determining that software corresponding to a target service needs to be upgraded from a first software version to a second software version, a control device determines at least two target service processing units and at least one associated service processing unit from the M service processing units, where packets of the target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version.

S220. Send first control information according to a preset first threshold, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

It should be noted that, in this embodiment of the present disclosure, the control device (for example, the foregoing MANO) implements functions of the present disclosure by controlling packet transmission from the associated service processing unit to the target service processing units. Therefore, when a quantity of the target service processing units is at least two, and a quantity of the associated service processing units is at least 1, an effect of the method 200 for controlling packet transmission in this embodiment of the present disclosure can be fully embodied. For ease of understanding, unless otherwise specified, the following describes the method 200 in detail using a processing procedure in which the quantity of the target service processing units is 2 and the quantity of the associated service processing units is 1, as an example.

In this embodiment of the present disclosure, when a user accesses a target service by installing client software on a terminal device or the like, packets of the target service that are generated by the client software are transmitted to an NFV system through a communications system. In the NFV system, a VNF#3 is communicatively connected to a VNF#1 and a VNF#2.

The packets of the target service are transmitted to the VNF#1 (namely, the first target service processing unit) through the VNF#3 (namely, an example of the associated service processing unit).

The VNF#1 may perform service processing on packets of the target service using processing software of a software version V#1 (namely, the first software version), and transmit the processed packets back to the terminal device.

The VNF#2 may perform service processing on packets of the target service using processing software of a software version V#2 (namely, the second software version), and transmit the processed packets back to the terminal device.

It should be noted that, the foregoing service processing process and the foregoing back transmission process may be similar to those in the prior art. Herein detailed descriptions thereof are omitted to avoid repetition.

In addition, in this embodiment of the present disclosure, the VNF#3, serving as a node on a path for transmitting a target packet to the VNF#1 or the VNF#2, may transmit the packet to the VNF#1, or may transmit the packet to the VNF#2; and the transmission may be forwarding by another node, or may be direct transmission, which is not particularly limited in the present disclosure. In addition, the VNF#3 itself may also perform service processing on the target packet, and the service processing by the VNF#3 may be related or not related to service processing by the VNF#1 or the VNF#2, which is not particularly limited in the present disclosure.

In this embodiment of the present disclosure, the software version V#2 is an upgraded version of the software version V#1, or is an updated version. Therefore, when the MANO determines that the software performing service processing on the target service needs to be upgraded from the software version V#1 to the software version V#2, the MANO may trigger the procedure of the method 200 in this embodiment of the present disclosure. It should be noted that, that the MANO determines that the software performing service processing on the target service needs to be upgraded from the software version V#1 to the software version V#2 may be similar to that in the prior art, for example, may be obtaining an upgrade instruction from an operator, or other manners. Herein detailed descriptions thereof are omitted to avoid repetition.

In this embodiment of the present disclosure, the MANO may determine, according to an upgrade plan, that the upgrade is completed in a preset time period. Therefore, before the first time period (for example, the first time period may be early in the preset time period), the MANO sends the first control information to the VNF#3 according to the preset first threshold, so that the VNF#3 sends the packets of the target service to the VNF#1 and/or the VNF#2 according to the first control information, so that in the first time period, a quantity of packets A of the target service transmitted from the VNF#3 to the VNF#1 and a quantity of packets B (namely, first packets) of the target service transmitted from the VNF#3 to the VNF#2 meet the following formula 1.

$$B/(A+B) \leq N \quad \text{formula 1}$$

The first threshold may be a ratio, namely, N in the formula 1. Therefore, it can be ensured that the packets B of the target service transmitted from the VNF#3 to the VNF#2 are a part of packets in all packets (a total quantity of packets A and packets B, namely, second packets) of the target service that are transmitted through the VNF#3, rather than all the packets. Therefore, when there is a defect in the software version V#2, in the first time period, because the packets A can be normally processed by the VNF#1 using the service processing software of the software version V#1, a terminal device that sends the packets A of the target service is not affected.

Optionally, the first threshold N meets the following condition: $0 < N \leq 0.5$.

Setting the first threshold causes the quantity of the packets B to be less than the quantity of the packets A, or causes the first threshold N to be less than or equal to 0.5, which can further reduce processing pressure of the VNF#2, or can further reduce processing pressure of the updated software version (namely, the software version V#2), and therefore can help to verify functions and performance of the new version.

Optionally, the first threshold N meets the following condition: $N=0.1$.

When a ratio of the quantity of the packets B to all the packets of the target service is less than 10%, it can further help to verify functions and performance of the new version.

In this embodiment of the present disclosure, the MANO may control packet transmission from the VNF#3 to the VNF#1 or the VNF#2 in multiple manners. The following describes the manners separately.

Manner 1

Optionally, the first control information is used to indicate the first threshold.

In this embodiment of the present disclosure, the MANO may directly deliver the first threshold (for example, the foregoing ratio N) to the VNF#3. Therefore, the VNF#3 may use a specified quantity (for example, 100) of packets as a cycle, and control, in a cycle according to the first threshold, a ratio of packets sent to the VNF#2 to the specified quantity of packets to be less than or equal to the first threshold. For example, assuming that the first threshold is 90% (or 0.1), the VNF#2 may send 90 packets that are received at a beginning of the first time period to the VNF#1, subsequent 10 packets to the VNF#2, subsequent 90 packets to the VNF#1, subsequent 10 packets to the VNF#2, and so on, until the first time period expires. Therefore, if all packets received in the first time period fall into T cycles, in the first T−1 cycles, a ratio of packets sent to the VNF#2 to all packets sent by the VNF#3 to the VNF#2 or the VNF#1 is equal to the first threshold, and in a $T^{th}$ cycle, a ratio of packets sent to the VNF#2 to all packets sent by the VNF#3 to the VNF#2 or the VNF#1 is less than or equal to the first threshold, and therefore, the foregoing formula 1 can be met.

It should be understood that, the foregoing illustrated manner of controlling, by the associated service processing unit (namely, the VNF#3), a ratio of packets sent to the first target service processing unit to packets sent to the second target service processing unit is intended for exemplary description only, and the present disclosure is not limited thereto. All other manners that can cause a ratio of a quantity of first packets (namely, packets transmitted to the VNF#2) to a quantity of second packets (namely, packets transmitted to the VNF#2 or the VNF#1) to be less than or equal to the first threshold shall fall within the protection scope of the present disclosure.

Manner 2

Optionally, a quantity of the associated service processing units is at least three; and the sending first control information to the associated service processing unit according to a preset first threshold includes grouping the associated service processing units according to the first threshold and the quantity of the associated service processing units, so as to determine a first associated service processing unit group and a second associated service processing unit group, where a ratio of a quantity of associated service processing units included in the first associated service processing unit group to a quantity of associated service processing units included in the second associated service processing unit group corresponds to the first threshold; and sending first control information of a first mode to the associated service processing units included in the first associated service processing unit group, where the first control information of the first mode is used to indicate that packets of the target service need to be transmitted to the second target service processing unit; or sending first control information of a second mode to the associated service processing units included in the second associated service processing unit group, where the first control information of the second mode is used to indicate that packets of the target service need to be transmitted to the first target service processing unit.

The manner 2 is applicable to processing when the quantity of the associated service processing units is three or more than three.

Therefore, the MANO may group the associated service processing units based on the first threshold.

As a grouping method, the following process may be illustrated.

The MANO may determine, according to the first threshold and the quantity of the associated service processing units, a quantity of associated service processing units included in each associated service processing unit group. As an example rather than a limitation, it is assumed that the first threshold is 90% (or 0.1), and it is assumed that there are 10 associated service processing units, which are marked as VNF#3-VNF#12 respectively.

Therefore, the MANO may allocate one VNF in the foregoing VNF#3-VNF#12 to a VNF group #1 (namely, an example of the first associated service processing unit group), and the MANO may allocate nine VNFs in the foregoing VNF#3-VNF#12 to a VNF group #2 (namely, an example of the second associated service processing unit group).

Afterward, the MANO may send indication information #1 (namely, an example of the first control information of the first mode) to the VNF group #1, where the indication information #1 is used to indicate that the VNF sends packets of the target service to the VNF#2.

Moreover, the MANO may send indication information #2 (namely, an example of the first control information of the second mode) to the VNF group #2, where the indication information #2 is used to indicate that the VNFs send packets of the target service to the VNF#1.

Therefore, in the first time period, one VNF sends packets of the target service to the VNF#2, and nine VNFs send packets of the target service to the VNF#1. Generally, based on system planning, quantities of packets that are sent by VNFs for a same service in a same time period are the same or approximately the same. Therefore, it can be ensured that, in the first time period, a ratio of a quantity of packets of the target service that are sent to the VNF#2 (namely, an example of the first packets) to a quantity of packets of the target service that are sent to the VNF#2 or the VNF#1 (namely, an example of the second packets) approaches 10% (corresponding to the first threshold), and can meet the foregoing formula 1.

Optionally, the grouping the associated service processing units according to the first threshold and the quantity of the associated service processing units includes grouping the associated service processing units according to the first threshold, the quantity of the associated service processing units, and geographical locations of physical resources of the associated service processing units.

When the foregoing grouping is performed, the MANO may further consider geographical locations of physical resources of the VNF#3-VNF#12. For example, when the operator requires that a software upgrade in a certain area should be met preferentially, the MANO may allocate a VNF whose physical resources are geographically located in the area to the foregoing VNF group #1.

It should be understood that, the foregoing illustrated method and process for performing grouping according to the geographical locations of the physical resources of the associated service processing units are intended for exemplary description only, and the present disclosure is not limited thereto.

Moreover, the foregoing numeric value of the first threshold and the quantity of the associated service processing units are intended for exemplary description only, and a person skilled in the art can make appropriate adjustments and changes to the foregoing grouping method according to the numeric value of the first threshold and the quantity of the associated service processing units.

Manner 3

Optionally, the sending first control information to the associated service processing unit according to a preset first threshold includes determining a mapping relationship between at least two service levels and the at least two target service processing units according to the first threshold, where one service level corresponds to only one target service processing unit; and sending first control information of a third mode to the associated service processing unit, where the first control information of the third mode is used to indicate the mapping relationship, so that when the associated service processing unit receives a first packet of the target service, the associated service processing unit looks up the mapping relationship according to identifier information carried in the first packet and used to indicate a service level of the first packet, so as to send the first packet to a service processing unit corresponding to the service level of the first packet.

In this embodiment of the present disclosure, the MANO may, for example, learn a quantity of service levels of users in the system, and a quantity of users included at each service level from the operator, and therefore may calculate a quantity of packets of each service level, and therefore may determine, according to the first threshold, a target service processing unit (for example, the foregoing VNF#2 or VNF#1) corresponding to the packets of each service level, and generate an entry recording a mapping relationship between each service level and each target service processing unit.

Therefore, the MANO may deliver the entry (namely, an example of the first control information of the third mode) to each associated service processing unit. Therefore, when receiving a packet of the target service, the associated service processing unit may extract, from the packet, a service level identifier used to indicate a service level of the packet (or a user who sends the packet), and therefore may determine the service level of the packet according to the service level identifier, and can look up the foregoing entry to determine whether the packet needs to be sent to the VNF#2 or the VNF#1. Assuming that multiple service levels exist, and that a calculated ratio of packets of a service level #1 in multiple service levels to packets of all the service levels is 10% (corresponding to the first threshold), in the entry delivered by the MANO, the service level #1 corresponds to the foregoing VNF#2, and therefore, in the first time period, packets of the service level #1 are sent to the VNF#2, and other packets are sent to the VNF#1. Therefore, it can be ensured that, in the first time period, the ratio of the quantity of the packets of the target service that are sent to the VNF#2 (namely, an example of the first packets) to the quantity of the packets of the target service that are sent to the VNF#2 or the VNF#1 (namely, an example of the second packets) approaches 10% (corresponding to the first threshold), and can meet the foregoing formula 1.

Using the foregoing manner 1 to manner 3, the MANO can control the associated service processing unit, so that the ratio of the quantity of the first packets to the quantity of the second packets is less than or equal to the first threshold.

Optionally, the method further includes sending third control information to the associated service processing unit, where the third control information is used to indicate that the associated service processing unit is forbidden to transmit packets of the target service to the first target service processing unit in a third time period, where the third time period is later than the first time period.

After the first time period, the MANO may notify each associated service processing unit that the associated service processing unit is forbidden to transmit packets of the target service to the VNF#1 (namely, an example of the first target service processing unit) in the third time period after the first time period, or that all packets of the target service are sent to the VNF#2 (namely, an example of the second target service processing unit). Therefore, in the third time period, the VNF#2 whose processing software is of the upgraded version processes all the packets of the target service, thereby implementing fast extinction of old-version services.

Optionally, the sending third control information to the associated service processing unit includes obtaining second running status information, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period; and when determining, according to the running status information, that the second target service processing unit runs normally before the third time period, sending the third control information to the associated service processing unit according to a preset second threshold.

In this embodiment of the present disclosure, before the third time period, the MANO may further detect whether the VNF#2 (namely, an example of the second target service processing unit) runs normally, or whether there is a defect in the processing software of the new version after the upgrade. As the foregoing detection method, the following process may be illustrated.

The MANO may obtain at least the following parameter: a resource usage of the VNF#2 before the third time period, an alarm status of the VNF#2 before the third time period, a key performance indicator of the VNF#2 before the third time period, a service processing success rate of the VNF#2 before the third time period, or a service processing delay of the VNF#2 before the third time period; and determine, according to the parameter, whether the VNF#2 runs normally. Moreover, a method for determining, according to each of the foregoing parameters, whether the VNF runs normally, may be similar to the prior art. Herein detailed descriptions thereof are omitted to avoid repetition.

Moreover, in this embodiment of the present disclosure, the MANO may further obtain running status information of the VNF#1 before the third time period, and compare the running status information of the VNF#1 before the third time period with the running status information of the VNF#2 before the third time period, and therefore determine whether the VNF#2 runs normally in the first time period, for example, if one of the following cases occurs, may determine that the VNF#2 runs abnormally.

Case A: The resource usage of the VNF#2 before the third time period is greater than a resource usage of the VNF#1 before the third time period, and a difference thereof exceeds a preset threshold A.

Case B: The VNF#2 reports an alarm before the third time period, but the VNF#1 reports no alarm before the third time period.

Case C: The key performance indicator of the VNF#2 before the third time period is lower than the key performance indicator of the VNF#2 before the third time period, and a difference thereof exceeds a preset threshold B.

Case D: The service processing success rate of the VNF#2 before the third time period is lower than a service processing success rate of the VNF#1 before the third time period, and a difference thereof exceeds a preset threshold C.

Case E: The service processing delay of the VNF#2 before the third time period is longer than the service processing delay of the VNF#2 before the third time period, and a difference thereof exceeds a preset threshold D.

It should be understood that, the foregoing illustrated parameters used for determining whether the VNF runs normally may be used separately or used jointly, which is not particularly limited in the present disclosure. Moreover, in addition to the foregoing illustrated parameters, all other parameters that can be used for determining whether the VNF runs normally shall fall within the protection scope of the present disclosure.

When the MANO determines that there is no defect in the processing software of the new version after the upgrade, the MANO hands over processing of all the packets of the target service to the VNF on which the processing software of the new version after the upgrade is installed, which can further improve reliability of the method for controlling packet transmission in the present disclosure.

Moreover, after handing over the processing of all the packets of the target service to the VNF on which the processing software of the new version after the upgrade is installed, the MANO may further trigger a resource release process of the VNF on which the processing software of the old version before the upgrade is installed, thereby completing resource recycling.

Optionally, the method further includes sending second control information to the associated service processing unit according to a preset second threshold, so as to control packet transmission performed for the target service between the associated service processing unit and the target service processing units in a second time period, so that a ratio of a quantity of third packets to a quantity of fourth packets is greater than the first threshold and that the ratio of the quantity of the third packets to the quantity of the fourth packets is greater than or less than or equal to the second threshold, where the second threshold is greater than the first threshold, the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

After the first time period (before the third time period in a case of processing of sampling the third time period), the MANO may further increase the second threshold, and deliver, to the associated service processing unit, the second control information corresponding to the second threshold, so that a quantity of packets C of the target service that are transmitted by each associated service processing unit from the associated service processing unit to the first target service processing unit according to the second control information in the second time period (after the first time period and before the third time period), and a quantity of packets D (namely, third packets) of the target service that are transmitted from the associated service processing unit to the second target service processing unit meet the following formula 2.

$$D/(C+D) \leq K \qquad \text{formula 2}$$

The second threshold may be a ratio, namely, K in the formula 1. Therefore, it can be ensured that the packets D of the target service that are transmitted from the associated service processing unit to the second target service processing unit are a part of packets in all packets (a total quantity of packets C and packets D, namely, fourth packets) of the target service that are transmitted through the associated service processing unit, rather than all the packets. Therefore, when there is a defect in the software version V#2, in the second time period, because the packets C can be normally processed by the VNF#1 using the service processing software of the software version V#1, a terminal device that sends the packets C of the target service is not affected.

In addition, in this embodiment of the present disclosure, processes of generating and delivering the second control information are similar to those of the foregoing first control information. Herein detailed descriptions thereof are omitted to avoid repetition.

Moreover, in this embodiment of the present disclosure, multiple second time periods may be included between the first time period and the third time period, and processing in each second time period is similar. Herein detailed descriptions thereof are omitted to avoid repetition.

Optionally, the sending second control information to the associated service processing unit according to a preset second threshold includes obtaining first running status information, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period; and when determining, according to the first running status information, that the second target service processing unit runs normally in the first time period, sending the second control information to the associated service processing unit according to the preset second threshold.

In this embodiment of the present disclosure, after the first time period, the MANO may further detect whether the VNF#2 (namely, an example of the second target service processing unit) runs normally, or whether there is a defect in the processing software of the new version after the upgrade. As the foregoing detection method, the following process may be illustrated.

The MANO may obtain at least the following parameter: a resource usage of the VNF#2 in the first time period, an alarm status of the VNF#2 in the first time period, a key performance indicator of the VNF#2 in the first time period, a service processing success rate of the VNF#2 in the first time period, or a service processing delay of the VNF#2 in the first time period; and determine, according to the parameter, whether the VNF#2 runs normally. Moreover, a method for determining, according to each of the foregoing parameters, whether the VNF runs normally, may be similar to the prior art. Herein detailed descriptions thereof are omitted to avoid repetition.

It should be understood that, the foregoing illustrated parameters used for determining whether the VNF runs normally may be used separately or used jointly, which is not particularly limited in the present disclosure. Moreover, in addition to the foregoing illustrated parameters, all other parameters that can be used for determining whether the VNF runs normally shall fall within the protection scope of the present disclosure.

Moreover, in this embodiment of the present disclosure, the MANO may further obtain running status information of the VNF#1 in the first time period, and compare the running status information of the VNF#1 in the first time period with the running status information of the VNF#2 in the first time period, and therefore determine whether the VNF#2 runs normally in the first time period, for example, if one of the following cases occurs, may determine that the VNF#2 runs abnormally.

Case F: The resource usage of the VNF#2 in the first time period is greater than a resource usage of the VNF#1 in the first time period, and a difference thereof exceeds a preset threshold E.

Case G: The VNF#2 reports an alarm in the first time period, but the VNF#1 reports no alarm in the first time period.

Case H: The key performance indicator of the VNF#2 in the first time period is lower than the key performance indicator of the VNF#2 in the first time period, and a difference thereof exceeds a preset threshold F.

Case I: The service processing success rate of the VNF#2 in the first time period is lower than a service processing success rate of the VNF#1 in the first time period, and a difference thereof exceeds a preset threshold G.

Case J: The service processing delay of the VNF#2 in the first time period is longer than the service processing delay of the VNF#2 in the first time period, and a difference thereof exceeds a preset threshold H.

When the MANO determines that there is no defect in the processing software of the new version after the upgrade, the MANO gradually increases the quantity of packets sent to the second target service processing unit that performs service processing on the packets using the processing software of the new version after the upgrade, which can further improve reliability of the method for controlling packet transmission in the present disclosure.

Figure 3:
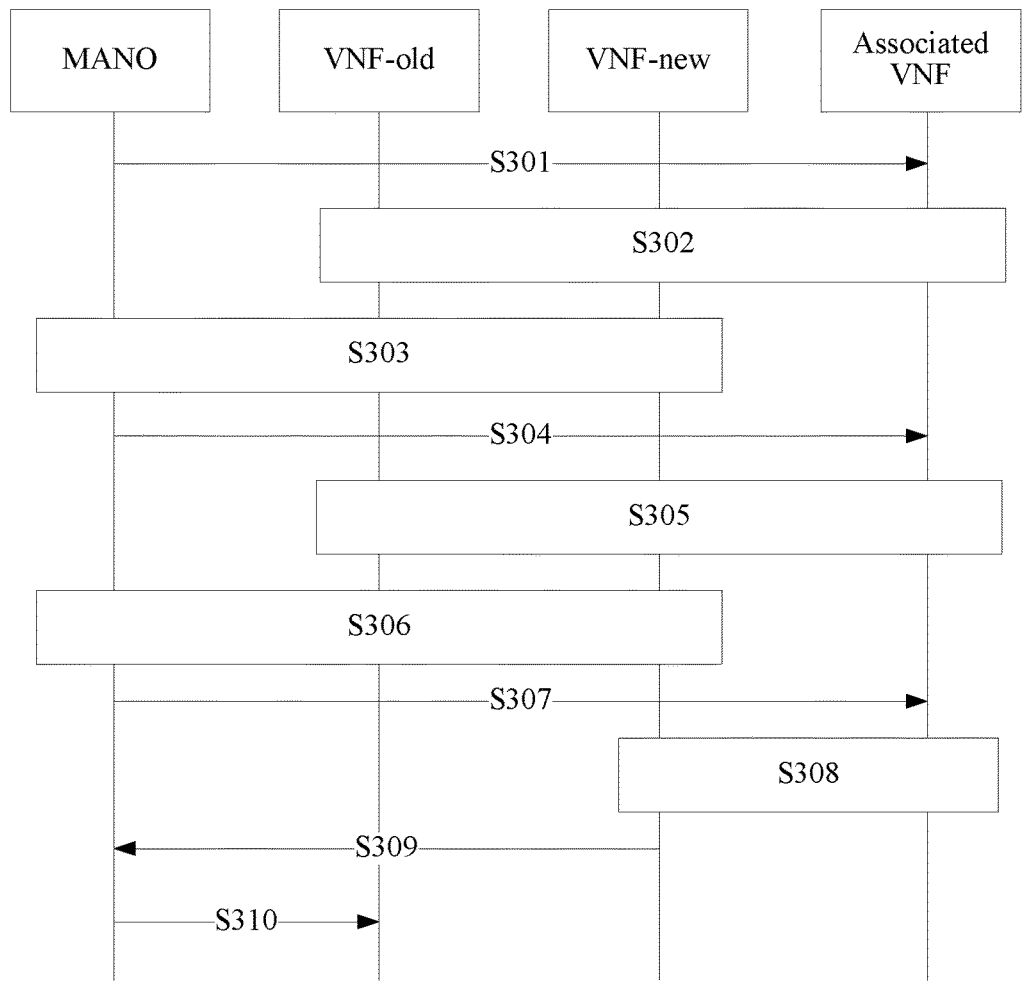
FIG. 3 is a schematic interaction diagram of a method for controlling packet transmission according to an embodiment of the present disclosure.

FIG. 3 is a schematic interaction diagram of a method for controlling packet transmission according to an embodiment of the present disclosure. In the interaction diagram shown in FIG. 3, a MANO may correspond to the foregoing control device, an associated VNF may correspond to the foregoing associated service processing unit, a VNF-old may correspond to the foregoing first target service processing unit, and a VNF-new may correspond to the foregoing second target service processing unit.

As shown in FIG. 3, in S301, the MANO sends first control information to the associated VNF according to a first threshold (assumed to be 10% herein).

In S302, in a first time period, the associated VNF sends 10% or less than 10% packets in all packets of a target service to the VNF-new for processing, and sends 90% or more than 90% packets in all the packets of the target service to the VNF-old for processing.

In S303, the MANO determines, according to running status information of the VNF-new, whether the VNF-new runs normally in the first time period, or whether there is a defect in a processing software version after the upgrade that is used by the VNF-new, and if the VNF-new runs normally, performs a subsequent step, or if the VNF-new runs abnormally, notifies the associated VNF to send packets of the target service to the VNF-old for processing.

In S304, the MANO sends second control information to the associated VNF according to a second threshold (assumed to be 50% herein).

In S305, in the first time period, the associated VNF sends 50% or less than 50% packets in all the packets of the target service to the VNF-new for processing, and sends 50% or more than 50% packets in all the packets of the target service to the VNF-old for processing.

In S306, the MANO determines, according to running status information of the VNF-new, whether the VNF-new runs normally in a second time period, or whether there is a defect in the processing software version after the upgrade that is used by the VNF-new, and if the VNF-new runs normally, performs a subsequent step, or if the VNF-new runs abnormally, instructs the associated VNF to send packets of the target service to the VNF-old for processing.

In S307, the MANO sends second control information to the associated VNF.

In S308, in a third time period, the associated VNF sends all the packets of the target service to the VNF-new for processing.

In S309, the MANO determines, according to running status information of the VNF-new, whether the VNF-new runs normally in the third time period, or whether there is a defect in the processing software version after the upgrade that is used by the VNF-new, and if the VNF-new runs normally, performs a subsequent step, or if the VNF-new runs abnormally, instructs the associated VNF to send packets of the target service to the VNF-old for processing.

In S310, the MANO controls the VNF-old to release resources.

It should be understood that, the foregoing illustrated manners for the MANO to deliver control information (including the first control information, the second control information, and the third control information) to the associated service processing unit are intended for exemplary description only, and the present disclosure is not limited thereto.

Optionally, the sending first control information according to a preset first threshold includes sending first control information of a fourth mode to user equipment according to the first threshold, so that the user equipment adds an indication identifier of the first target service processing unit or an indication identifier of the second target service processing unit to a packet of the target service according to the first control information of the fourth mode, and that the associated service processing unit sends the packet of the target service to a corresponding target service processing unit according to the indication identifier carried in the received packet of the target service.

In this embodiment of the present disclosure, the MANO may group UEs according to the first threshold and a quantity of UEs, and determine a quantity of UEs included in each UE group. As an example rather than a limitation, it is assumed that the first threshold is 90% (or 0.1) and that there are 10 UEs, which are marked as UE#1-UE#10 respectively.

Therefore, the MANO may allocate one UE in the foregoing UE#1-UE#10 to a UE group #1, and the MANO may allocate nine UEs in the foregoing UE#1-UE#10 to a UE group #2.

Afterward, the MANO may send indication information #3 to the UE group #1 (using a VNF that can directly communicate with the UE), where the indication information #3 is used to indicate that the UE adds an identifier X to a packet of the target service, where the identifier X is used to indicate that the packet needs to be sent to the second target service processing unit.

Moreover, the MANO may send indication information #4 to the UE group #2 (using a VNF that can directly communicate with the UE), where the indication information #4 is used to indicate that the UE adds an identifier Y to a packet of the target service, where the identifier Y is used to indicate that the packet needs to be sent to the first target service processing unit.

Therefore, in the first time period, when receiving the packet to which the identifier X or the identifier Y is added, the associated service processing unit may send the packet to the first target service processing unit or the second target service processing unit according to the identifier carried in the packet. Therefore, one UE sends packets of the target service to the VNF#2, and nine VNFs send packets of the target service to the VNF#1. Therefore, it can be ensured that, in the first time period, a ratio of a quantity of packets of the target service that are sent to the VNF#2 (namely, an example of first packets) to a quantity of packets of the target service that are sent to the VNF#2 or the VNF#1 (namely, an example of second packets) approaches 10% (corresponding to the first threshold), and can meet the foregoing formula 1.

Alternatively, the MANO may directly deliver the first threshold (for example, the foregoing ratio N) to the UE. Therefore, the UE may use a specified quantity (for example, 100) of packets as a cycle, and control, in a cycle according to the first threshold, a ratio of packets to which the identifier X is added, to the specified quantity of packets to be less than or equal to the first threshold. For example, assuming that the first threshold is 90% (or 0.1), the UE may add the identifier Y to 90 packets that need to be sent at a beginning of the first time period, add the identifier X to subsequent 10 packets, add the identifier Y to subsequent 90 packets, add the identifier X to subsequent 10 packets, and so on, until the first time period expires. Therefore, if all packets received in the first time period fall into T cycles, in the first T−1 cycles, a ratio of packets to which the identifier X is added, to all packets is equal to the first threshold, and in a $T^{th}$ cycle, a ratio of packets to which the identifier X is added, to all packets is less than or equal to the first threshold, and therefore, the foregoing formula 1 can be met.

It should be understood that, in this embodiment of the present disclosure, a quantity of the first target processing units (namely, the foregoing VNF#1) and a quantity of the second target service processing units (namely, the foregoing VNF#2) are not particularly limited, and may be one or more. That is, when there are multiple first target service processing units and second target service processing units, the multiple first target service processing units and second target service processing units may constitute a virtual network. Moreover, the multiple first target service processing units may perform packet transmission with the associated service processing unit using one interface or multiple interfaces. Likewise, the multiple second target service processing units may perform packet transmission with the associated service processing unit using one interface or multiple interfaces. This is not particularly limited in the present disclosure.

According to the method for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

FIG. 4 shows a schematic flowchart of a method 400 for controlling packet transmission according to an embodiment of the present disclosure. The method is described from a perspective of an associated service processing unit. The method 400 is performed in an NFV system including M service processing units, and the M service processing units include at least two target service processing units and at least one associated service processing unit, where packets of the target service need to be transmitted to the at least two target service processing units through the at least one associated service processing unit, a first target service processing unit in the at least two target service processing units is configured to perform, on packets of the target service, service processing corresponding to a first software version, a second target service processing unit in the at least two target service processing units is configured to perform, on packets of the target service, service processing corresponding to a second software version, M≥3, and as shown in FIG. 4, the method 400 includes the following steps.

S410. When software corresponding to the target service needs to be upgraded from the first software version to the second software version, the target associated service processing unit in the at least one associated service receives first control information that is sent by a control device according to a preset first threshold.

S420. Transmit packets of the target service to the first target service processing unit or the second target service processing unit in a first time period according to the first control information, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

Optionally, the method further includes receiving second control information that is sent by the control device according to a preset second threshold, where the second threshold is greater than the first threshold; and transmitting packets of the target service to the first target service processing unit or the second target service processing unit in a second time period according to the second control information, so that a ratio of a quantity of third packets to a quantity of fourth packets is greater than the first threshold and that the ratio of the quantity of the third packets to the quantity of the fourth packets is greater than or less than or equal to the second threshold, where the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

Optionally, the second control information is sent after the control device obtains first running status information and determines, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

Optionally, the method further includes receiving third control information sent by the control device, where the third control information is used to indicate that the associated service processing unit is forbidden to transmit packets of the target service to the first target service processing unit in a third time period, where the third time period is later than the first time period; and forbidding, in the third time period according to the third control information, transmitting the packets of the target service to the first target service processing unit.

Optionally, the third control information is sent after the control device obtains second running status information and determines, according to the second running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

Optionally, the first control information is used to indicate the first threshold.

Optionally, a quantity of the associated service processing units is at least three; and the receiving first control information that is sent by a control device according to a preset first threshold includes receiving control information of a first mode that is sent by the control device according to the preset first threshold, where the first control information of the first mode is used to indicate that packets of the target service need to be transmitted to the second target service processing unit, and the target associated service processing unit belongs to a first associated service processing unit group; or receiving control information of a second mode that is sent by the control device according to the preset first threshold, where the first control information of the second mode is used to indicate that packets of the target service need to be transmitted to the first target service processing unit, and the target associated service processing unit belongs to a second associated service processing unit group, where the first associated service processing unit group and the second associated service processing unit group are determined by the control device by grouping the associated service processing units according to the first threshold and the quantity of the associated service processing units.

Optionally, the first associated service processing unit group and the second associated service processing unit group are determined by the control device by grouping the associated service processing units according to the first threshold, the quantity of the associated service processing units, and geographical locations of physical resources of the associated service processing units.

Optionally, the receiving first control information that is sent by a control device according to a preset first threshold includes receiving first control information of a third mode that is sent by the control device according to the preset first threshold, where the first control information of the third mode is used to indicate a mapping relationship between at least two service levels and the at least two target service processing units, and the mapping relationship is determined by the control device according to the first threshold; and the transmitting packets of the target service to the first target service processing unit or the second target service processing unit in a first time period according to the first control information includes receiving a first packet of the target service in the first time period; and looking up the mapping relationship according to identifier information carried in the first packet and used to indicate a service level of the first packet, so as to send the first packet to a service processing unit corresponding to the service level of the first packet.

Optionally, the first threshold N meets the following condition: 0<N≤0.5.

Optionally, the first threshold N meets the following condition: N=0.1.

Optionally, the control device is a management and orchestration MANO device.

The method 400 for controlling packet transmission in this embodiment of the present disclosure is performed by the associated service processing unit (for example, the VNF#3) mentioned in the foregoing method, and each processing procedure in the method 400 corresponds to an action of the foregoing associated service processing unit. Herein detailed descriptions thereof are omitted to avoid repetition.

According to the method for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

The foregoing describes in detail the methods for controlling packet transmission according to the embodiments of the present disclosure with reference to FIG. 1 to FIG. 4. The following describes in detail apparatuses for controlling packet transmission according to the embodiments of the present disclosure with reference to FIG. 5 and FIG. 6.

FIG. 5 shows a schematic block diagram of an apparatus 500 for controlling packet transmission according to an embodiment of the present disclosure. The apparatus 500 is configured in an NFV system including M service processing units, where M≥3, and as shown in FIG. 5, the apparatus 500 includes a determining unit 510 configured to, when determining that software corresponding to a target service needs to be upgraded from a first software version to a second software version, determine at least two target service processing units and at least one associated service processing unit from the M service processing units, where packets of the target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version; and generate first control information according to a preset first threshold; and a sending unit 520 configured to send the first control information, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

Optionally, the determining unit 510 is further configured to generate second control information according to a preset second threshold; and the sending unit 520 is further configured to send the second control information, so as to control packet transmission performed for the target service between the associated service processing unit and the target service processing units in a second time period, so that a ratio of a quantity of third packets to a quantity of fourth packets is greater than the first threshold and that the ratio of the quantity of the third packets to the quantity of the fourth packets is greater than or less than or equal to the second threshold, where the second threshold is greater than the first threshold, the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

Optionally, before the sending unit 520 sends the second control information, the determining unit 510 is further configured to obtain first running status information, and determine, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

Optionally, the sending unit 520 is further configured to send third control information, where the third control information is used to indicate that the associated service processing unit is forbidden to transmit packets of the target service to the first target service processing unit in a third time period, where the third time period is later than the first time period.

Optionally, before the sending unit 520 sends the third control information, the determining unit 510 is further configured to obtain second running status information, and determine, according to the running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

Optionally, the first control information is used to indicate the first threshold.

Optionally, a quantity of the associated service processing units is at least three; and the determining unit 510 is configured to group the associated service processing units according to the first threshold and the quantity of the associated service processing units, so as to determine a first associated service processing unit group and a second associated service processing unit group, where a ratio of a quantity of associated service processing units included in the first associated service processing unit group to a quantity of associated service processing units included in the second associated service processing unit group corresponds to the first threshold; and generate first control information of a first mode that needs to be sent to the associated service processing units included in the first associated service processing unit group, where the first control information of the first mode is used to indicate that packets of the target service need to be transmitted to the second target service processing unit; or generate first control information of a second mode that needs to be sent to the associated service processing units included in the second associated service processing unit group, where the first control information of the second mode is used to indicate that packets of the target service need to be transmitted to the first target service processing unit.

Optionally, the determining unit 510 is configured to group the associated service processing units according to the first threshold, the quantity of the associated service processing units, and geographical locations of physical resources of the associated service processing units.

Optionally, the determining unit 510 is configured to determine a mapping relationship between at least two service levels and the at least two target service processing units according to the first threshold, where one service level corresponds to only one target service processing unit, and generate first control information of a third mode, where the first control information of the third mode is used to indicate the mapping relationship; and the sending unit 520 is configured to send the first control information of the third mode to the associated service processing unit, so that when the associated service processing unit receives a first packet of the target service, the associated service processing unit looks up the mapping relationship according to identifier information carried in the first packet and used to indicate a service level of the first packet, so as to send the first packet to a service processing unit corresponding to the service level of the first packet.

Optionally, the first threshold N meets the following condition: $0 < N \leq 0.5$.

Optionally, the first threshold N meets the following condition: $N=0.1$.

Optionally, the apparatus 500 is a management and orchestration MANO device.

The apparatus 500 for controlling packet transmission according to this embodiment of the present disclosure may correspond to the control device (for example, the MANO) in the method in the embodiments of the present disclosure, and the units, namely, modules, in the apparatus 500 and the foregoing other operations and/or functions are respectively intended to implement the corresponding procedure of the method 100 in FIG. 2. For brevity, details are not further described herein.

According to the apparatus for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

Figure 6:
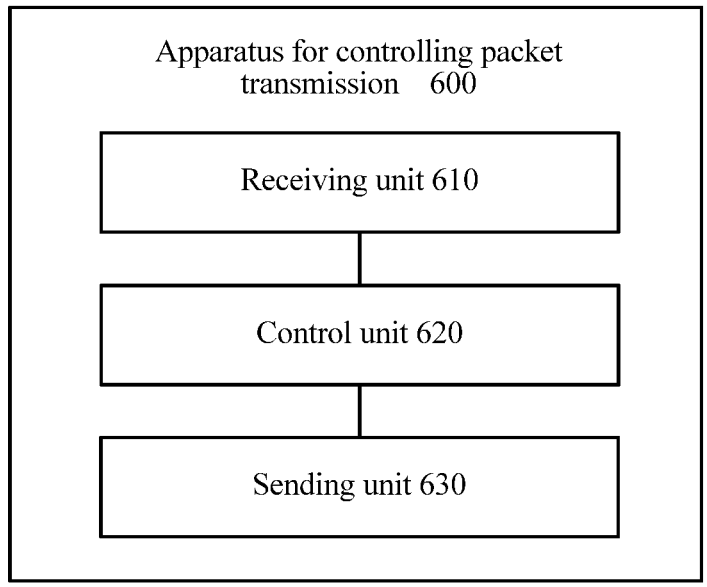
FIG. 6 is a schematic block diagram of an apparatus for controlling packet transmission according to another embodiment of the present disclosure.

FIG. 6 shows a schematic block diagram of an apparatus 600 for controlling packet transmission according to an embodiment of the present disclosure. The apparatus 600 is configured in an NFV system including M service processing units, and the M service processing units include at least two target service processing units and at least one associated service processing unit, where packets of the target service need to be transmitted to the at least two target service processing units through the at least one associated service processing unit, a first target service processing unit in the at least two target service processing units is configured to perform, on packets of the target service, service processing corresponding to a first software version, a second target service processing unit in the at least two target service processing units is configured to perform, on packets of the target service, service processing corresponding to a second software version, M≥3, the apparatus belongs to the associated service processing unit, and as shown in FIG. 6, the apparatus 600 includes a receiving unit 610 configured to receive, when software corresponding to the target service needs to be upgraded from the first software version to the second software version, first control information that is sent by a control device according to a preset first threshold; and a control unit 620 configured to control, in a first time period according to the first control information, a sending unit 630 to transmit packets of the target service to the first target service processing unit or the second target service processing unit, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

Optionally, the receiving unit 610 is further configured to receive second control information that is sent by the control device according to a preset second threshold, where the second threshold is greater than the first threshold; and the control unit 620 is further configured to control, in a second time period according to the second control information, the sending unit 630 to transmit packets of the target service to the first target service processing unit or the second target service processing unit, so that a ratio of a quantity of third packets to a quantity of fourth packets is greater than the first threshold and that the ratio of the quantity of the third packets to the quantity of the fourth packets is greater than or less than or equal to the second threshold, where the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

Optionally, the second control information is sent after the control device obtains first running status information and determines, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

Optionally, the receiving unit 610 is further configured to receive third control information sent by the control device, where the third control information is used to indicate that the associated service processing unit is forbidden to transmit packets of the target service to the first target service processing unit in a third time period, where the third time period is later than the first time period; and the control unit 620 is further configured to forbid, in the third time period according to the third control information, the sending unit 630 to transmit the packets of the target service to the first target service processing unit.

Optionally, the third control information is sent after the control device obtains second running status information and determines, according to the second running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

Optionally, the first control information is used to indicate the first threshold.

Optionally, a quantity of the associated service processing units is at least three; and the receiving unit 610 is configured to receive control information of a first mode that is sent by the control device according to the preset first threshold, where the first control information of the first mode is used to indicate that packets of the target service need to be transmitted to the second target service processing unit, and the target associated service processing unit belongs to a first associated service processing unit group; or the receiving unit 610 is configured to receive control information of a second mode that is sent by the control device according to the preset first threshold, where the first control information of the second mode is used to indicate that packets of the target service need to be transmitted to the first target service processing unit, and the target associated service processing unit belongs to a second associated service processing unit group, where the first associated service processing unit group and the second associated service processing unit group are determined by the control device by grouping the associated service processing units according to the first threshold and the quantity of the associated service processing units.

Optionally, the first associated service processing unit group and the second associated service processing unit group are determined by the control device by grouping the associated service processing units according to the first threshold, the quantity of the associated service processing units, and geographical locations of physical resources of the associated service processing units.

Optionally, the receiving unit 610 is configured to receive first control information of a third mode that is sent by the control device according to the preset first threshold, where the first control information of the third mode is used to indicate a mapping relationship between at least two service levels and the at least two target service processing units, and the mapping relationship is determined by the control device according to the first threshold; and the control unit 620 is configured to obtain a first packet of the target service in the first time period, and look up the mapping relationship according to identifier information carried in the first packet and used to indicate a service level of the first packet, so as to control the sending unit 630 to send the first packet to a service processing unit corresponding to the service level of the first packet.

Optionally, the first threshold N meets the following condition: $0<N\leq0.5$.

Optionally, the first threshold N meets the following condition: $N=0.1$.

Optionally, the control device is a management and orchestration MANO device.

The apparatus 600 for controlling packet transmission according to this embodiment of the present disclosure may correspond to the associated service processing unit in the method in the embodiments of the present disclosure, and the units, namely, modules, in the apparatus 600 and the foregoing other operations and/or functions are respectively intended to implement the corresponding procedure of the method 400 in FIG. 4. For brevity, details are not further described herein.

According to the apparatus for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

The foregoing describes in detail the methods for controlling packet transmission according to the embodiments of the present disclosure with reference to FIG. 1 to FIG. 4. The following describes in detail devices for controlling packet transmission according to the embodiments of the present disclosure with reference to FIG. 7 and FIG. 8.

Figure 7:
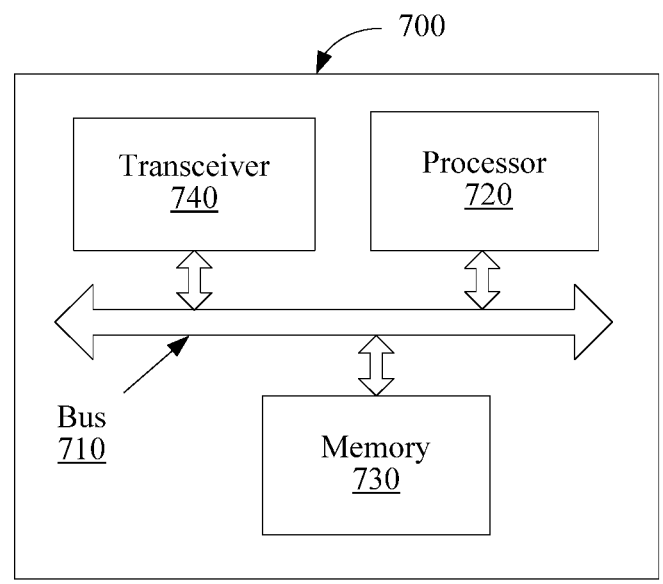
FIG. 7 is a schematic structural diagram of a device for controlling packet transmission according to an embodiment of the present disclosure.

FIG. 7 shows a schematic block diagram of a device 700 for controlling packet transmission according to an embodiment of the present disclosure. The device 700 is configured in an NFV system including M service processing units, where $M\geq 3$, and as shown in FIG. 7, the device 700 includes a bus 710; a processor 720 connected to the bus 710; a memory 730 connected to the bus 710; and a transceiver 740 connected to the bus 710.

The processor 720 invokes, using the bus 710, a program stored in the memory 730, so that the processor is configured to, when determining that software corresponding to a target service needs to be upgraded from a first software version to a second software version, determine at least two target service processing units and at least one associated service processing unit from the M service processing units, where packets of the target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version; and generate first control information according to a preset first threshold; and configured to control the transceiver 740 to send the first control information, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

Optionally, the processor 720 is further configured to generate second control information according to a preset second threshold; and configured to control the transceiver 740 to send the second control information, so as to control packet transmission performed for the target service between the associated service processing unit and the target service processing units in a second time period, so that a ratio of a quantity of third packets to a quantity of fourth packets is greater than the first threshold and that the ratio of the quantity of the third packets to the quantity of the fourth packets is greater than or less than or equal to the second threshold, where the second threshold is greater than the first threshold, the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

Optionally, the processor 720 is further configured to obtain first running status information, and determine, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

Optionally, the processor 720 is further configured to control the transceiver 740 to send third control information, where the third control information is used to indicate that the associated service processing unit is forbidden to transmit packets of the target service to the first target service processing unit in a third time period, where the third time period is later than the first time period.

Optionally, the processor 720 is further configured to obtain second running status information, and determine, according to the running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

Optionally, the first control information is used to indicate the first threshold.

Optionally, a quantity of the associated service processing units is at least three; and the processor 720 is configured to group the associated service processing units according to the first threshold and the quantity of the associated service processing units, so as to determine a first associated service processing unit group and a second associated service processing unit group, where a ratio of a quantity of associated service processing units included in the first associated service processing unit group to a quantity of associated service processing units included in the second associated service processing unit group corresponds to the first threshold; and generate first control information of a first mode that needs to be sent to the associated service processing units included in the first associated service processing unit group, where the first control information of the first mode is used to indicate that packets of the target service need to be transmitted to the second target service processing unit; or generate first control information of a second mode that needs to be sent to the associated service processing units included in the second associated service processing unit group, where the first control information of the second mode is used to indicate that packets of the target service need to be transmitted to the first target service processing unit.

Optionally, the processor 720 is configured to group the associated service processing units according to the first threshold, the quantity of the associated service processing units, and geographical locations of physical resources of the associated service processing units.

Optionally, the processor 720 is configured to determine a mapping relationship between at least two service levels and the at least two target service processing units according to the first threshold, where one service level corresponds to only one target service processing unit, and generate first control information of a third mode, where the first control information of the third mode is used to indicate the mapping relationship; and configured to control the transceiver 740 to be configured to send the first control information of the third mode to the associated service processing unit, so that when the associated service processing unit receives a first packet of the target service, the associated service processing unit looks up the mapping relationship according to identifier information carried in the first packet and used to indicate a service level of the first packet, so as to send the first packet to a service processing unit corresponding to the service level of the first packet.

Optionally, the first threshold N meets the following condition: $0 < N \leq 0.5$.

Optionally, the first threshold N meets the following condition: $N=0.1$.

Optionally, the device 700 is a management and orchestration MANO device.

In a specific application, the processor 720 may implement or perform steps and logical block diagrams disclosed in the method embodiments of the present disclosure. A general purpose processor 720 may be a microprocessor, or the processor may be any conventional processor, decoder, or the like. Steps of the methods disclosed with reference to the embodiments of the present disclosure may be directly executed and completed by a hardware processor, or may be executed and completed using a combination of hardware and software modules in a decoding processor. The software modules may be located in a mature storage medium in the art, such as a random access memory, a flash memory, a read-only memory, a programmable read-only memory, an electrically-erasable programmable memory, or a register. The storage medium is located in the memory 730, and the processor 720 reads information in the memory 730 and completes the steps in the foregoing methods in combination with hardware of the processor 720.

It should be understood that in this embodiment of the present disclosure, the processor 720 may be a central processing unit (CPU), or that the processor 720 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 730 may include a read-only memory and a random access memory, and provide an instruction and data to the processor 720. A part of the memory 730 may further include a non-volatile random access memory. For example, the memory 730 may further store information of a device type.

The bus 710 may further include a power bus, a control bus, a status signal bus, and the like, in addition to a data bus. However, for clear description, various types of buses in the figure are marked as the bus 710.

In an implementation process, each step of the foregoing methods may be completed using an integrated logic circuit of hardware in the processor 720 or an instruction in a form of software. Steps of the methods disclosed with reference to the embodiments of the present disclosure may be directly executed and completed by a hardware processor, or may be executed and completed using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory 730, and the processor 720 reads information in the memory 730 and completes the steps in the foregoing methods in combination with hardware of the processor 720. To avoid repetition, details are not further described herein.

The device 700 for controlling packet transmission according to this embodiment of the present disclosure may correspond to the control device (for example, the MANO)

in the method in the embodiments of the present disclosure, and the units, namely, modules, in the device 700 and the foregoing other operations and/or functions are respectively intended to implement the corresponding procedure of the method 100 in FIG. 2. For brevity, details are not further described herein.

According to the device for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

Figure 8:
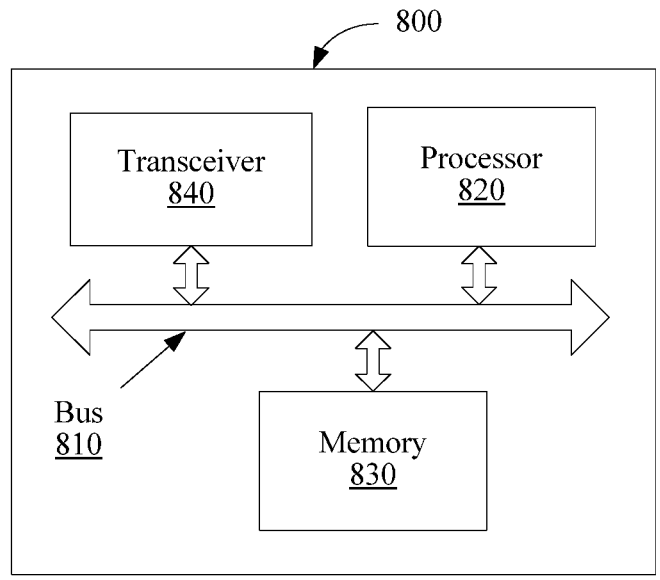
FIG. 8 is a schematic structural diagram of a device for controlling packet transmission according to another embodiment of the present disclosure.

FIG. 8 shows a schematic block diagram of a device 800 for controlling packet transmission according to an embodiment of the present disclosure. The device 800 is configured in an NFV system including M service processing units, and the M service processing units include at least two target service processing units and at least one associated service processing unit, where packets of the target service need to be transmitted to the at least two target service processing units through the at least one associated service processing unit, a first target service processing unit in the at least two target service processing units is configured to perform, on packets of the target service, service processing corresponding to a first software version, a second target service processing unit in the at least two target service processing units is configured to perform, on packets of the target service, service processing corresponding to a second software version, M≥3, the device belongs to the associated service processing unit, and as shown in FIG. 8, the device 800 includes a bus 810; a processor 820 connected to the bus 810; a memory 830 connected to the bus 810; and a transceiver 840 connected to the bus 810.

The processor 820 invokes, using the bus 810, a program stored in the memory 830, so that the processor is configured to control the transceiver 840 to receive, when software corresponding to the target service needs to be upgraded from the first software version to the second software version, first control information that is sent by a control device according to a preset first threshold; and configured to control, in a first time period according to the first control information, the transceiver 840 to transmit packets of the target service to the first target service processing unit or the second target service processing unit, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

Optionally, the processor 820 is further configured to control the transceiver 840 to receive second control information that is sent by the control device according to a preset second threshold, where the second threshold is greater than the first threshold; and further configured to control, in a second time period according to the second control information, the transceiver 840 to transmit packets of the target service to the first target service processing unit or the second target service processing unit, so that a ratio of a quantity of third packets to a quantity of fourth packets is greater than the first threshold and that the ratio of the quantity of the third packets to the quantity of the fourth packets is greater than or less than or equal to the second threshold, where the second time period is later than the first time period, the fourth packets include packets of the target service that are transmitted to the first target service processing unit in the second time period and packets of the target service that are transmitted to the second target service processing unit in the second time period, and the third packets include the packets of the target service that are transmitted to the second target service processing unit in the second time period.

Optionally, the second control information is sent after the control device obtains first running status information and determines, according to the first running status information, that the second target service processing unit runs normally in the first time period, where the first running status information is used to indicate at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

Optionally, the processor 820 is further configured to control the transceiver 840 to receive third control information sent by the control device, where the third control information is used to indicate that the associated service processing unit is forbidden to transmit packets of the target service to the first target service processing unit in a third time period, where the third time period is later than the first time period; and configured to forbid, in the third time period according to the third control information, the sending unit 630 (as shown in FIG. 6), to transmit the packets of the target service to the first target service processing unit.

Optionally, the third control information is sent after the control device obtains second running status information and determines, according to the second running status information, that the second target service processing unit runs normally before the third time period, where the second running status information is used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

Optionally, the first control information is used to indicate the first threshold.

Optionally, a quantity of the associated service processing units is at least three; and the processor 820 is configured to control the transceiver 840 to receive control information of a first mode that is sent by the control device according to the preset first threshold, where the first control information of the first mode is used to indicate that packets of the target service need to be transmitted to the second target service processing unit, and the target associated service processing unit belongs to a first associated service processing unit group; or the processor 820 is configured to control the transceiver 840 to receive control information of a second mode that is sent by the control device according to the preset first threshold, where the first control information of the second mode is used to indicate that packets of the target service need to be transmitted to the first target service processing unit, and the target associated service processing unit belongs to a second associated service processing unit group, where the first associated service processing unit group and the second associated service processing unit group are determined by the control device by grouping the associated service processing units according to the first threshold and the quantity of the associated service processing units.

Optionally, the first associated service processing unit group and the second associated service processing unit group are determined by the control device by grouping the associated service processing units according to the first threshold, the quantity of the associated service processing units, and geographical locations of physical resources of the associated service processing units.

Optionally, the processor 820 is configured to control the transceiver 840 to receive first control information of a third mode that is sent by the control device according to the preset first threshold, where the first control information of the third mode is used to indicate a mapping relationship between at least two service levels and the at least two target service processing units, and the mapping relationship is determined by the control device according to the first threshold; and the processor 820 is configured to obtain a first packet of the target service in the first time period, and look up the mapping relationship according to identifier information carried in the first packet and used to indicate a service level of the first packet, so as to control the transceiver 840 to send the first packet to a service processing unit corresponding to the service level of the first packet.

Optionally, the first threshold N meets the following condition: 0<N≤0.5.

Optionally, the first threshold N meets the following condition: N=0.1.

Optionally, the control device is a management and orchestration MANO device.

In a specific application, the processor 820 may implement or perform steps and logical block diagrams disclosed in the method embodiments of the present disclosure. A general purpose processor 820 may be a microprocessor, or the processor may be any conventional processor, decoder, or the like. Steps of the methods disclosed with reference to the embodiments of the present disclosure may be directly executed and completed by a hardware processor, or may be executed and completed using a combination of hardware and software modules in a decoding processor. The software modules may be located in a mature storage medium in the art, such as a random access memory, a flash memory, a read-only memory, a programmable read-only memory, an electrically-erasable programmable memory, or a register.

The storage medium is located in the memory 830, and the processor 820 reads information in the memory 830 and completes the steps in the foregoing methods in combination with hardware of the processor 820.

It should be understood that in this embodiment of the present disclosure, the processor 820 may be a CPU, or that the processor 820 may be another general purpose processor, a DSP, an ASIC, an FPGA or another programmable logic device, a discrete gate or a transistor logic device, a discrete hardware component, or the like. The general purpose processor may be a microprocessor, or the processor may be any conventional processor or the like.

The memory 830 may include a read-only memory and a random access memory, and provide an instruction and data to the processor 820. A part of the memory 830 may further include a non-volatile random access memory. For example, the memory 830 may further store information of a device type.

The bus 810 may further include a power bus, a control bus, a status signal bus, and the like, in addition to a data bus. However, for clear description, various types of buses in the figure are marked as the bus 810.

In an implementation process, each step of the foregoing methods may be completed using an integrated logic circuit of hardware in the processor 820 or an instruction in a form of software. Steps of the methods disclosed with reference to the embodiments of the present disclosure may be directly executed and completed by a hardware processor, or may be executed and completed using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory 830, and the processor 820 reads information in the memory 830 and completes the steps in the foregoing methods in combination with hardware of the processor 820. To avoid repetition, details are not further described herein.

The device 800 for controlling packet transmission according to this embodiment of the present disclosure may correspond to the associated service processing unit in the method in the embodiments of the present disclosure, and the units, namely, modules, in the device 800 and the foregoing other operations and/or functions are respectively intended to implement the corresponding procedure of the method 400 in FIG. 4. For brevity, details are not further described herein.

According to the device for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

Figure 9:
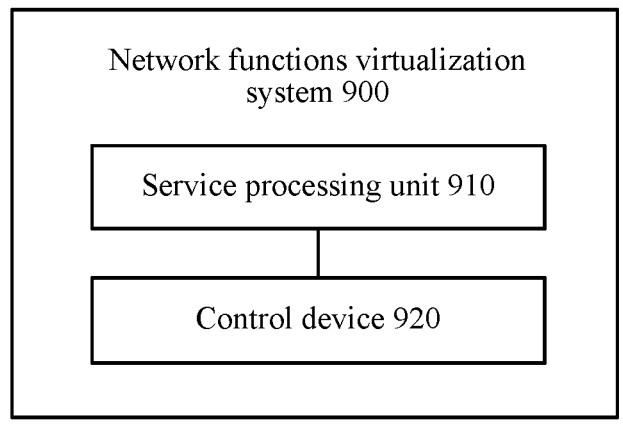
FIG. 9 is a schematic structural diagram of a system for controlling packet transmission according to an embodiment of the present disclosure.

FIG. 9 shows a schematic block diagram of an NFV system 900 according to an embodiment of the present disclosure. As shown in FIG. 9, the NFV system 900 includes M service processing units 910, where the M service processing units include at least two target service processing units and at least one associated service processing unit, packets of a target service need to be transmitted to the at least two target service processing units through the at least one associated service processing unit, a first target service processing unit in the at least two target service processing units is configured to perform, on packets of the target service, service processing corresponding to the first software version, and a second target service processing unit in the at least two target service processing units is configured to perform, on packets of the target service, service processing corresponding to the second software version; and a control device 920 configured to send first control information according to a preset first threshold when determining that software corresponding to the target service needs to be upgraded from the first software version to the second software version, so as to control packet transmission performed for the target service between the associated service processing unit and the target service processing units in a first time period, so that a ratio of a quantity of first packets to a quantity of second packets is less than or equal to the first threshold, where the second packets include packets of the target service that are transmitted to the first target service processing unit in the first time period and packets of the target service that are transmitted to the second target service processing unit in the first time period, and the first packets include the packets of the target service that are transmitted to the second target service processing unit in the first time period.

Optionally, the control device 920 is further configured to send third control information, where the third control information is used to indicate that the associated service processing unit is forbidden to transmit packets of the target service to the first target service processing unit in a third time period, where the third time period is later than the first time period.

The service processing unit 910 according to this embodiment of the present disclosure may correspond to the service processing unit (the target service processing unit or the associated service processing unit) in the method in the embodiments of the present disclosure, and the units, namely, modules, in the associated service processing unit in the service processing unit 910 and the foregoing other operations and/or functions are respectively intended to implement the corresponding procedure of the method 400 in FIG. 4. For brevity, details are not further described herein.

The control device 920 according to this embodiment of the present disclosure may correspond to the control device (for example, the MANO) in the method in the embodiments of the present disclosure, and the units, namely, modules, in the control device 920 and the foregoing other operations and/or functions are respectively intended to implement the corresponding procedure of the method 200 in FIG. 2. For brevity, details are not further described herein.

According to the system for controlling packet transmission in this embodiment of the present disclosure, a quantity of packets sent to a first target service processing unit and a quantity of packets sent to a second target service processing unit by an associated service processing unit can be controlled in a first time period according to a preset first threshold. The first target service processing unit is configured to perform, on packets, service processing corresponding to a software version before an update, and the second target service processing unit is configured to perform, on packets, service processing corresponding to a software version after the update, so that a ratio of a quantity of first packets to a quantity of second packets is less than or equal to the first threshold, where the second packets are packets transmitted by the associated service processing unit to the first target service processing unit or the second target service processing unit, and the first packets are packets transmitted by the associated service processing unit to the second target service processing unit. In this way, in the first time period, only some packets corresponding to the first threshold are sent to undergo service processing corresponding to the software version after the update, and further, in the first time period, when there is a defect in the new version, service access of all users is not affected, and user experience during the software upgrade can be improved.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling packet transmission, the method being performed in a network functions virtualization (NFV) system comprising M service processing units, M being greater than or equal to three, and the method comprising:
    determining, by a control device, at least two target service processing units and at least one associated service processing unit from the M service processing units when software corresponding to a target service needs to be upgraded from a first software version to a second software version, packets of the target service needing to be transmitted to the at least two target service processing units through the at least one associated service processing unit, a first target service processing unit in the at least two target service processing units being configured to perform, on packets of the target service, service processing corresponding to the first software version, and a second target service processing unit in the at least two target service processing units being configured to perform, on packets of the target service, service processing corresponding to the second software version; and
    sending first control information according to a preset first threshold to control packet transmission performed for the target service between the associated processing unit and the target service processing units in a first time period such that a ratio of a quantity of first packets to a quantity of second packets is less than or equal to the first threshold, the second packets comprising packets of the target service that are transmitted to the first target service processing unit in the first time period and packets of the target service that are transmitted to the second target service processing unit in the first time period, the first packets comprising the packets of the target service that are transmitted to the second target service processing unit in the first time period, and the first threshold being greater than zero and less than or equal to a half.

2. The method of claim 1, wherein the method further comprises sending second control information according to a preset second threshold to control packet transmission performed for the target service between the associated service processing unit and the target service processing units in a second time period such that a ratio of a quantity of third packets to a quantity of fourth packets is greater than the first threshold and that the ratio of the quantity of the third packets to the quantity of the fourth packets is greater than or less than or equal to the second threshold, the second threshold ring greater than the first threshold, the second time period being later than the first time period, the fourth packets comprising packets of the target service that are transmitted to the first target service processing unit in the second time period and packets of the target service that are transmitted to the second target service processing unit in the second time period, and the third packets comprising the packets of the target service that are transmitted to the second target service processing unit in the second time period.

3. The method of claim 2, wherein sending the second control information according to the preset second threshold comprises:
    obtaining first running status information, the first running status information indicating at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period; and
    sending the second control information according to the preset second threshold when, according to the first running status information, the second target service processing unit runs normally in the first time period.

4. The method of claim 1, wherein the method further comprises sending third control information, the third control information indicating that the associated service processing unit is forbidden to transmit packets of the target service to the first target service processing unit in a third time period, and the third time period being later than the first time period.

5. The method of claim 4, wherein sending the third control information comprises:
    obtaining second running status information, the second running status information indicating at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period; and sending the third control information according to the preset second threshold when, according to the running status information, the second target service processing unit runs normally before the third time period.

6. The method of claim 1, wherein the first control information indicates the first threshold.

7. The method of claim 1, wherein a quantity of the associated service processing units is at least three, and sending the first control information according to the preset first threshold comprises:

grouping the associated service processing units according to the first threshold and the quantity of the associated service processing units to determine a first associated service processing unit group and a second associated service processing unit group, a ratio of a quantity of associated service processing units comprised in the first associated service processing unit group to a quantity of associated service processing units comprised in the second associated service processing unit group corresponding to the first threshold; and either sending first control information of a first mode to the associated service processing units comprised in the first associated service processing unit group, the first control information of the first mode indicating that packets of the target service need to be transmitted to the second target service processing unit; or sending first control information of a second mode to the associated service processing units comprised in the second associated service processing unit group, the first control information of the second mode indicating that packets of the target service need to be transmitted to the first target service processing unit.

8. The method of claim 7, wherein grouping the associated service processing units according to the first threshold and the quantity of the associated service processing units comprises grouping the associated service processing units according to the first threshold, the quantity of the associated service processing units, and geographical locations of physical resources of the associated service processing units.

9. The method of claim 1, wherein sending the first control information according to the preset first threshold comprises:

determining a mapping relationship between at least two service levels and the at least two target service processing units according to the first threshold, one service level corresponding to only one target service processing unit; and sending first control information of a third mode to the associated service processing unit, the first control information of the third mode indicating the mapping relationship such that when the associated service processing unit receives a first packet of the target service, the associated service processing unit looks up the mapping relationship according to identifier information carried in the first packet and indicating a service level of the first packet to send the first packet to a service processing unit corresponding to the service level of the first packet.

10. The method of claim 1, wherein sending the first control information according to the preset first threshold comprises sending first control information of a fourth mode to user equipment according to the first threshold such that the user equipment adds an indication identifier of the first target service processing unit or an indication identifier of the second target service processing unit to a packet of the target service according to the first control information of the fourth mode, and that the associated service processing unit sends the packet of the target service to a corresponding target service processing unit according to the indication identifier carried in the received packet of the target service.

11. The method of claim 1, wherein the first threshold is equal to one tenth.

12. A method for controlling packet transmission, comprising:

receiving, by a target associated service processing unit in at least one associated service, first control information that is sent by a control device according to a preset first threshold when software corresponding to the target service needs to be upgraded from the first software version to the second software version; and transmitting packets of the target service to the first target service processing unit or the second target service processing unit in a first time period according to the first control information such that a ratio of a quantity of first packets to a quantity of second packets is less than or equal to the first threshold, the second packets comprising packets of the target service that are transmitted to the first target service processing unit in the first time period and packets of the target service that are transmitted to the second target service processing unit in the first time period, the first packets comprising the packets of the target service that are transmitted to the second target service processing unit in the first time period, the method being performed in a network functions virtualization (NFV) system comprising M service processing units, the M service processing units comprising at least two target service processing units and at least one associated service processing unit, packets of the target service needing to be transmitted to the at least two target service processing units through the at least one associated service processing unit, a first target service processing unit in the at least two target service processing units being configured to perform, on packets of the target service, service processing corresponding to a first software version, a second target service processing unit in the at least two target service processing units being configured to perform, on packets of the target service, service processing corresponding to a second software version, M being greater than or equal to three, and the first threshold being greater than zero and less than or equal to a half.

13. The method of claim 12, wherein the method further comprises:

receiving second control information that is sent by the control device according to a preset second threshold, the second threshold being greater than the first threshold; and transmitting packets of the target service to the first target service processing unit or the second target service processing unit in a second time period according to the second control information such that a ratio of a quantity of third packets to a quantity of fourth packets is greater than the first threshold and that the ratio of the quantity of the third packets to the quantity of the fourth packets is greater than or less than or equal to the second threshold, the second time period being later than the first time period, the fourth packets comprising packets of the target service that are transmitted to the first target service processing unit in the second time period and packets of the target service that are transmitted to the second target service processing unit in the second time period, and the third packets comprising the packets of the target service that are transmitted to the second target service processing unit in the second time period.

14. The method of claim 13, wherein the second control information is sent after the control device obtains first running status information and determines, according to the first running status information, that the second target service processing unit runs normally in the first time period, and the first running status information indicating at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

15. The method of claim 12, wherein the method further comprises:
receiving third control information sent by the control device, the third control information indicating that the associated service processing unit is forbidden to transmit packets of the target service to the first target service processing unit in a third time period, the third time period being later than the first time period; and
forbidding, in the third time period according to the third control information, transmitting the packets of the target service to the first target service processing unit.

16. The method of claim 15, wherein the third control information is sent after the control device obtains second running status information and determines, according to the second running status information, that the second target service processing unit runs normally before the third time period, and the second running status information indicating at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

17. The method of claim 12, wherein the first control information indicating the first threshold.

18. The method of claim 12, wherein a quantity of the associated service processing units is at least three, and receiving the first control information that is sent by the control device according to the preset first threshold comprises:
either receiving control information of a first mode that is sent by the control device according to the preset first threshold, the first control information of the first mode indicating that packets of the target service need to be transmitted to the second target service processing unit, and the target associated service processing unit belonging to a first associated service processing unit group; or
receiving control information of a second mode that is sent by the control device according to the preset first threshold, the first control information of the second mode indicating that packets of the target service need to be transmitted to the first target service processing unit, the target associated service processing unit belonging to a second associated service processing unit group, and
the first associated service processing unit group and the second associated service processing unit group being determined by the control device by grouping the associated service processing units according to the first threshold and the quantity of the associated service processing units.

19. The method of claim 18, wherein the first associated service processing unit group and the second associated service processing unit group are determined by the control device by grouping the associated service processing units according to the first threshold, the quantity of the associated service processing units, and geographical locations of physical resources of the associated service processing units.

20. The method of claim 12, wherein receiving the first control information that is sent by the control device according to the preset first threshold comprises receiving first control information of a third mode that is sent by the control device according to the preset first threshold, the first control information of the third mode indicating a mapping relationship between at least two service levels and the at least two target service processing units, the mapping relationship being determined by the control device according to the first threshold, and transmitting the packets of the target service to the first target service processing unit or the second target service processing unit in the first time period according to the first control information comprises:
receiving a first packet of the target service in the first time period; and
looking up the mapping relationship according to identifier information carried in the first packet and used to indicate a service level of the first packet to send the first packet to a service processing unit corresponding to the service level of the first packet.

21. The method of claim 12, wherein the first threshold is equal to one tenth.

22. The method claim 12, wherein the control device is a management and orchestration (MANO) device.

23. An apparatus for controlling packet transmission, the apparatus being configured in a network functions virtualization (NFV) system comprising M service processing units, M being greater than or equal to three, and the apparatus comprising:
a memory comprising instructions; and
a processor coupled to the memory, the instructions causing the processor to be configured to:
determine at least two target service processing units and at least one associated service processing unit from the M service processing units when software corresponding to a target device needs to be upgraded from a first software version to a second software version, packets of the target service needing to be transmitted to the at least two target service processing units through the at least one associated service processing unit, a first target service processing unit in the at least two target service processing units being configured to perform, on packets of the target service, service processing corresponding to the first software version, and a second target service processing unit in the at least two target service processing units being configured to perform, on packets of the target service, service processing corresponding to the second software version, and generate first control information according to a preset first threshold; and send the first control information to control packet transmission performed for the target service between the associated service processing unit and the target service processing units in a first time period such that a ratio of a quantity of first packets to a quantity of second packets is less than or equal to the first threshold, the second packets comprising packets of the target service that are transmitted to the first target service processing unit in the first time period and packets of the target service that are transmitted to the second target service processing unit in the first time period, the first packets comprising the packets of the target service that are transmitted to the second target service processing unit in the first time period, and the first threshold being greater than zero and less than or equal to a half.

24. The apparatus of claim 23, wherein the instructions further cause the processor to be configured to:

generate second control information according to a preset second threshold; and send the second control information to control packet transmission performed for the target service between the associated service processing unit and the target service processing units in a second time period such that a ratio of a quantity of third packets to a quantity of fourth packets is greater than the first threshold and that the ratio of the quantity of the third packets to the quantity of the fourth packets is greater than or less than or equal to the second threshold, the second threshold being greater than the first threshold, the second time period being later than the first time period, the fourth packets comprising packets of the target service that are transmitted to the first target service processing unit in the second time period and packets of the target service that are transmitted to the second target service processing unit in the second time period, and the third packets comprising the packets of the target service that are transmitted to the second target service processing unit in the second time period.

25. The apparatus claim 24, wherein the instructions further cause the processor to be configured to, before sending the second control information, obtain first running status information, and determine, according to the first running status information, that the second target service processing unit runs normally in the first time period, and the first running status information indicating at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

26. The apparatus of claim 23, wherein the instructions further cause the processor to be configured to send third control information, the third control information indicating that the associated service processing unit is forbidden to transmit packets of the target service to the first target service processing unit in a third time period, and the third time period being later than the first time period.

27. The apparatus of claim 26, wherein the instructions further cause the processor to be configured to, before sending the third control information, obtain second running status information, and determine, according to the running status information, that the second target service processing unit runs normally before the third time period, and the second running status information indicating at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

28. The apparatus of claim 23, wherein the first control information indicates the first threshold.

29. The apparatus of claim 23, wherein a quantity of the associated service processing units is at least three, and the instructions further causing the processor to be configured to:

group the associated service processing units according to the first threshold and the quantity of the associated service processing units to determine a first associated service processing unit group and a second associated service processing unit group, a ratio of a quantity of associated service processing units comprised in the first associated service processing unit group to a quantity of associated service processing units comprised in the second associated service processing unit group corresponding to the first threshold; and either generate first control information of a first mode that needs to be sent to the associated service processing units comprised in the first associated service processing unit group, the first control information of the first mode indicating that packets of the target service need to be transmitted to the second target service processing unit; or generate first control information of a second mode that needs to be sent to the associated service processing units comprised in the second associated service processing unit group, the first control information of the second mode indicating that packets of the target service need to be transmitted to the first target service processing unit.

30. The apparatus claim 29, wherein the instructions further cause the processor to be configured to group the associated service processing units according to the first threshold, the quantity of the associated service processing units, and geographical locations of physical resources of the associated service processing units.

31. The apparatus of claim 23, wherein the instructions further cause the processor to be configured to:

determine a mapping relationship between at least two service levels and the at least two target service processing units according to the first threshold, one service level corresponding to only one target service processing unit;

generate first control information of a third mode, the first control information of the third mode indicating the mapping relationship; and send the first control information of the third mode to the associated service processing unit such that when the associated service processing unit receives a first packet of the target service, the associated service processing unit looks up the mapping relationship according to identifier information carried in the first packet and used to indicate a service level of the first packet to send the first packet to a service processing unit corresponding to the service level of the first packet.

32. The apparatus of claim 23, wherein the instructions further cause the processor to be configured to send first control information of a fourth mode to user equipment according to the first threshold such that the user equipment adds an indication identifier of the first target service processing unit or an indication identifier of the second target service processing unit to a packet of the target service according to the first control information of the fourth mode, and that the associated service processing unit sends the packet of the target service to a corresponding target service processing unit according to the indication identifier carried in the received packet of the target service.

33. The apparatus of claim 23, wherein the first threshold is equal to one tenth.

34. An apparatus for controlling packet transmission, comprising:
a memory comprising instructions; and
a processor coupled to the memory, the apparatus being configured in a network functions virtualization (NFV) system comprising M service processing units, the M service processing units comprising at least two target service processing units and at least one associated service processing unit, packets of the target service needing to be transmitted to the at least two target service processing units through the at least one associated service processing unit, a first target service processing unit in the at least two target service processing units being configured to perform, on packets of the target service, service processing corresponding to a first software version, a second target service processing unit in the at least two target service processing units is configured to perform, on packets of the target service, service processing corresponding to a second software version, M being greater than or equal to three, the apparatus belonging to the associated service processing unit, and the instructions causing the processor to be configured to:
receive, when software corresponding to the target service needs to be upgraded from the first software version to the second software version, first control information that is sent by a control device according to a preset first threshold; and
control, in a first time period according to the first control information, a sending unit to transmit packets of the target service to the first target service processing unit or the second target service processing unit such that a ratio of a quantity of first packets to a quantity of second packets is less than or equal to the first threshold, the second packets comprising packets of the target service that are transmitted to the first target service processing unit in the first time period and packets of the target service that are transmitted to the second target service processing unit in the first time period, the first packets comprising the packets of the target service that are transmitted to the second target service processing unit in the first time period, and the first threshold being greater than zero and less than or equal to a half.

35. The apparatus of claim 34, wherein the instructions further cause the processor to be configured to:

receive second control information that is sent by the control device according to a preset second threshold, the second threshold being greater than the first threshold; and
control, in a second time period according to the second control information, the sending unit to transmit packets of the target service to the first target service processing unit or the second target service processing unit such that a ratio of a quantity of third packets to a quantity of fourth packets being greater than the first threshold and that the ratio of the quantity of the third packets to the quantity of the fourth packets is greater than or less than or equal to the second threshold, the second time period being later than the first time period, the fourth packets comprising packets of the target service that are transmitted to the first target service processing unit in the second time period and packets of the target service that are transmitted to the second target service processing unit in the second time period, and the third packets comprising the packets of the target service that are transmitted to the second target service processing unit in the second time period.

36. The apparatus of claim 35, wherein the second control information is sent after the control device obtains first running status information and determines, according to the first running status information, that the second target service processing unit runs normally in the first time period, and the first running status information indicating at least one of the following parameters: a resource usage of the second target service processing unit in the first time period, an alarm status of the second target service processing unit in the first time period, a key performance indicator of the second target service processing unit in the first time period, a service processing success rate of the second target service processing unit in the first time period, or a service processing delay of the second target service processing unit in the first time period.

37. The apparatus of claim 34, wherein the instructions further cause the processor to be configured to:
receive third control information sent by the control device, the third control information indicating that the associated service processing unit is forbidden to transmit packets of the target service to the first target service processing unit in a third time period, and the third time period being later than the first time period; and
forbid, in the third time period according to the third control information, the sending unit to transmit the packets of the target service to the first target service processing unit.

38. The apparatus of claim 37, wherein the third control information is sent after the processor obtains second running status information and determines, according to the second running status information, that the second target service processing unit runs normally before the third time period, and the second running status information being used to indicate at least one of the following parameters: a resource usage of the second target service processing unit before the third time period, an alarm status of the second target service processing unit before the third time period, a key performance indicator of the second target service processing unit before the third time period, a service processing success rate of the second target service processing unit before the third time period, or a service processing delay of the second target service processing unit before the third time period.

39. The apparatus claim 34, wherein the first control information indicates the first threshold.

40. The apparatus of claim 34, wherein a quantity of the associated service processing units is at least three, and the instructions further causing the processor to be configured to:
- either receive control information of a first mode that is sent by the control device according to the preset first threshold, the first control information of the first mode indicating that packets of the target service need to be transmitted to the second target service processing unit, and the target associated service processing unit belonging to a first associated service processing unit group; or
- receive control information of a second mode that is sent by the control device according to the preset first threshold, the first control information of the second mode indicating is that packets of the target service need to be transmitted to the first target service processing unit, the target associated service processing unit belonging to a second associated service processing unit group, and the first associated service processing unit group and the second associated service processing unit group being determined by the control device by grouping the associated service processing units according to the first threshold and the quantity of the associated service processing units.

41. The apparatus of claim 40, wherein the first associated service processing unit group and the second associated service processing unit group are determined by the control device by grouping the associated service processing units according to the first threshold, the quantity of the associated service processing units, and geographical locations of physical resources of the associated service processing units.

42. The apparatus of claim 34, wherein the instructions further cause the processor to be configured to:
- receive first control information of a third mode that is sent by the control device according to the preset first threshold, the first control information of the third mode indicating a mapping relationship between at least two service levels and the at least two target service processing units, and the mapping relationship being determined by the control device according to the first threshold;
- obtain a first packet of the target service in the first time period; and
- look up the mapping relationship according to identifier information carried in the first packet and used to indicate a service level of the first packet to control the sending unit to send the first packet to a service processing unit corresponding to the service level of the first packet.

43. The apparatus of claim 34, wherein the first threshold is equal to one tenth.

44. The apparatus of claim 34, wherein the control device is a management and orchestration (MANO) device.

45. A network functions virtualization (NFV) system, comprising:
- M service processing units, the M service processing units comprising at least two target service processing units and at least one associated service processing unit, packets of a target service needing to be transmitted to the at least two target service processing units through the at least one associated service processing unit, a first target service processing unit in the at least two target service processing units being configured to perform, on packets of the target service, service processing corresponding to the first software version, and a second target service processing unit in the at least two target service processing units being configured to perform, on packets of the target service, service processing corresponding to the second software version; and
- a control device configured to send first control information to the associated service processing unit according to a preset first threshold when determining that software corresponding to the target service needs to be upgraded from the first software version to the second software version to control packet transmission performed for the target service between the associated service processing unit and the target service processing units in a first time period such that a ratio of a quantity of first packets to a quantity of second packets is less than or equal to the first threshold, the second packets comprising packets of the target service that are transmitted to the first target service processing unit in the first time period and packets of the target service that are transmitted to the second target service processing unit in the first time period, the first packets comprising the packets of the target service that are transmitted to the second target service processing unit in the first time period, and the first threshold being greater than zero and less than or equal to a half.

46. The NFV system of claim 45, wherein the control device is further configured to send third control information to the associated service processing unit, the third control information indicating that the associated service processing unit is forbidden to transmit packets of the target service to the first target service processing unit in a third time period, and the third time period being later than the first time period.

* * * * *